(12) United States Patent
Ikenaga et al.

(10) Patent No.: US 11,056,935 B2
(45) Date of Patent: Jul. 6, 2021

(54) ROTATION ANGLE SENSOR SYSTEM AND SEMICONDUCTOR DEVICE

(71) Applicant: RENESAS ELECTRONICS CORPORATION, Tokyo (JP)

(72) Inventors: Yoshifumi Ikenaga, Tokyo (JP); Akane Hiroshima, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 205 days.

(21) Appl. No.: 16/281,928

(22) Filed: Feb. 21, 2019

(65) Prior Publication Data

US 2019/0280537 A1 Sep. 12, 2019

(30) Foreign Application Priority Data

Mar. 12, 2018 (JP) .............................. JP2018-043816

(51) Int. Cl.
| | |
|---|---|
| *H02K 1/24* | (2006.01) |
| *H02P 6/16* | (2016.01) |
| *H02P 6/15* | (2016.01) |
| *H02K 1/14* | (2006.01) |
| *H02K 24/00* | (2006.01) |
| *H02K 3/52* | (2006.01) |
| *G01D 5/20* | (2006.01) |

(52) U.S. Cl.
CPC ................. *H02K 1/24* (2013.01); *G01D 5/20* (2013.01); *G01D 5/2046* (2013.01); *H02K 1/14* (2013.01); *H02K 3/522* (2013.01); *H02K 24/00* (2013.01); *H02P 6/153* (2016.02); *H02P 6/16* (2013.01)

(58) Field of Classification Search
CPC ............ H02K 1/187; H02K 5/20; H02K 3/50; H02K 24/00
USPC ........... 310/68 B, 261.1; 324/207.17, 207.25
See application file for complete search history.

(56) References Cited

U.S. PATENT DOCUMENTS

2015/0239501 A1* 8/2015 Fujita .................. B62D 15/021
                                                   701/41
2018/0351437 A1* 12/2018 Ikeda ................... H02K 11/225

FOREIGN PATENT DOCUMENTS

JP          2009098028 A   *   5/2009
JP          2013152251 A   *   8/2013

OTHER PUBLICATIONS

T. Nakahara et al., "Development of Variable Reluctance (VR) Resolver", JAE Technical Report, No. 29, Mar. 2006.

* cited by examiner

Primary Examiner — Jose A Gonzalez Quinones
(74) Attorney, Agent, or Firm — McDermott Will & Emery LLP

(57) ABSTRACT

A synthesis circuit synthesizes detection signals from a plurality of detection coils to generate a synthesized detection signal indicating a sine component of a rotation angle of a rotor. In this regard, the detection coils which are synthesis targets when the synthesis circuit generates the synthesized detection signal include a detection coil of a salient pole installed at a first electrical angle based on a first pole of the rotor and detection coils of salient poles installed at a second electrical angle different from the first electrical angle based on the first pole, and do not include detection coils installed at the first electrical angle based on a second pole.

13 Claims, 17 Drawing Sheets

MINIMUM ERROR

ROTATION ANGLE SENSOR SYSTEM AND SEMICONDUCTOR DEVICE

CROSS-REFERENCE TO RELATED APPLICATION

The present application claims priority from Japanese Patent Application No. 2018-043816 filed on Mar. 12, 2018, the content of which is hereby incorporated by reference into this application.

TECHNICAL FIELD OF THE INVENTION

The present invention relates to a rotation angle sensor system and a semiconductor device, and more particularly relates to, for example, a technique of a variable reluctance (VR) resolver and a resolver digital converter.

BACKGROUND OF THE INVENTION

"Development of Variable Reluctance (VR) Resolver", JAE Technical Report, No. 29, March 2006 (Non-Patent Document 1) discloses a variable reluctance (VR) resolver whose shaft angle multiplier (the number of polar pairs of a rotor) is 3 and whose number of salient poles of a stator is 12.

SUMMARY OF THE INVENTION

For example, as disclosed in Non-Patent Document 1, a variable reluctance (VR) resolver (rotation angle sensor) in which salient poles wound by detection coils are installed on a stator is known, and in the variable reluctance (VR) resolver, a rotation angle is detected by using a change in a distance between the poles of a rotor and the salient poles of the stator due to rotation of the rotor (resultant change in a reluctance). Causes of a detection error of a rotation angle of this rotation angle sensor are mainly a position shift of salient poles and eccentricity of a rotor shaft.

In addition, as disclosed in Non-Patent Document 1, the rotation angle sensor whose shaft angle multiplier is 3 and whose number of salient poles of the stator is 12 adopts a symmetrical structure in which each salient pole is installed at a position at which electrical angles become equal based on each pole of the rotor. For example, when a salient pole (and a detection coil) is installed at a certain electrical angle based on a certain pole of the rotor, another salient pole is installed at the same electrical angle based on another pole of the rotor. In this case, for example, by synthesizing detection signals from these two detection coils, it is possible to average a detection error.

On the other hand, sensitivity with respect to the position shift of the salient poles (a shift amount of detection signals from the detection coils) can change according to the electrical signal as appropriate. Hence, when the asymmetrical structure as disclosed in Non-Patent Document 1 is used, if a salient pole (and a detection coil) is installed at an electrical angle at which the sensitivity maximizes, based on a certain pole of the rotor, another salient pole is installed at the electrical angle at which the sensitivity maximizes, based on another pole of the rotor. As a result, it is concerned that, when a position shift of these two salient poles occurs, a situation that the two detection signals having maximum shift amounts are synthesized occurs, and a maximum value of a detection error of the overall rotation angle sensor becomes large.

Embodiments described below have been made in light of the above situation, and other problems and novel features will be made apparent from the disclosure of the description and the accompanying drawings.

A rotation angle sensor system according to one embodiment includes a rotation angle sensor and a synthesis circuit. The rotation angle sensor has a shaft angle multiplier which is an integer equal to or more than 2, and includes a rotor having a first pole and a second pole and a stator having a plurality of salient poles wound by detection coils. The synthesis circuit synthesizes detection signals from the plurality of detection coils to generate first and second synthesized detection signals indicating a sine component and a cosine component of a rotation angle of the rotor. In addition, the detection coils which are synthesis targets when the synthesis circuit generates one of the first synthesized detection signal and the second synthesized detection signal include a first detection coil installed at a first electrical angle based on the first pole and a second detection coil installed at a second electrical angle different from the first electrical angle based on the second pole, and do not include a detection coil installed at the first electrical angle based on the second pole.

According to the one embodiment, it is possible to reduce a detection error of a rotation angle.

BRIEF DESCRIPTIONS OF THE DRAWINGS

DESCRIPTIONS OF THE PREFERRED EMBODIMENTS

Figure 1:
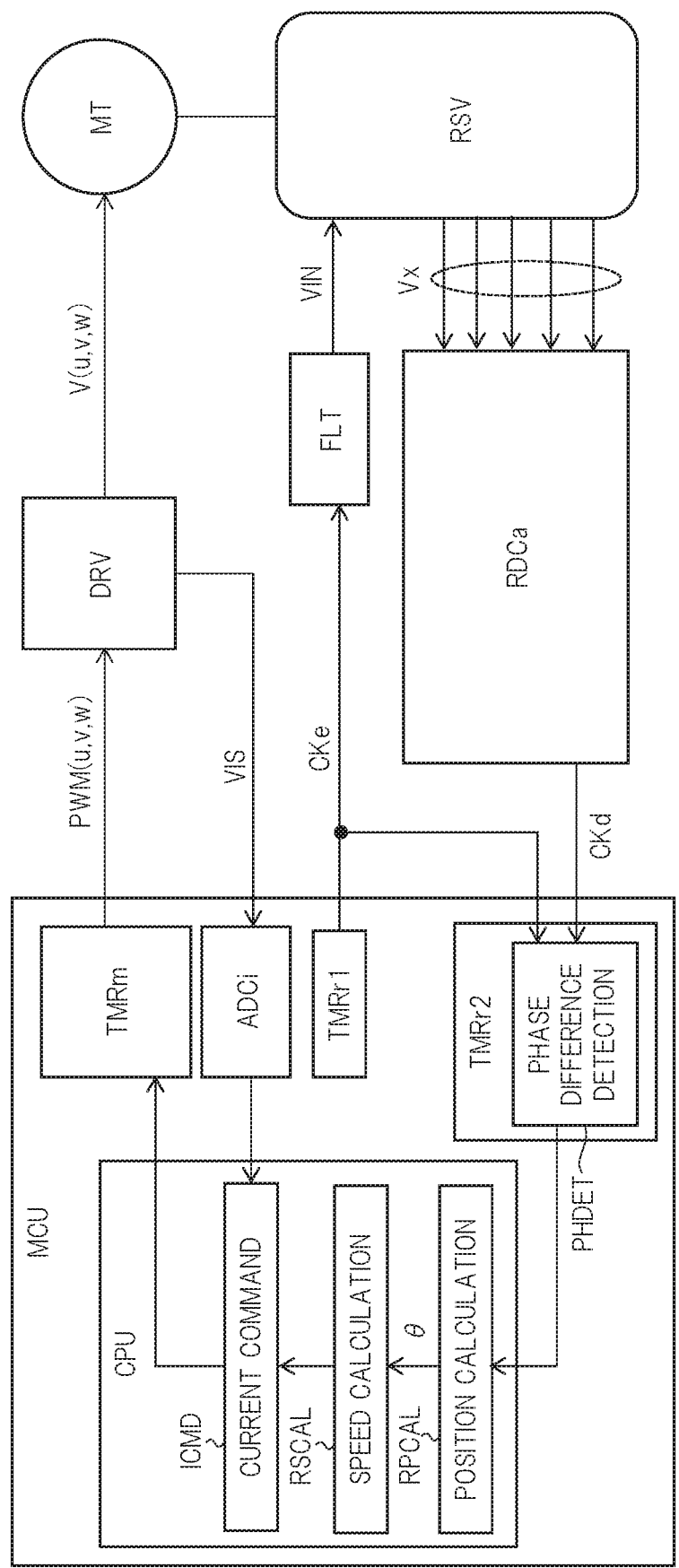
FIG. 1 is a schematic diagram illustrating a configuration example of main units of a rotation angle sensor system according to a first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when mentioning the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Furthermore, a circuit element which constitutes each functional block of embodiments is not limited in particular, but is formed on a semiconductor substrate such as single crystal silicon by an integrated circuit technique such as a known CMOS (complementary MOS transistor).

The embodiments of the present invention will be described in detail based on the drawings. In addition, the same members will be principally assigned with the same reference characters in all drawings for explaining the embodiments, and repetitive description thereof will be omitted.

First Embodiment

<<Outline of Rotation Angle Sensor System>>

FIG. 1 is a schematic diagram illustrating a configuration example of main units of a rotation angle sensor system according to the first embodiment of the present invention. The rotation angle sensor system illustrated in FIG. 1 includes a motor MT, a driver DRV, a rotation angle sensor (resolver) RSV, a filter FLT, a resolver digital converter RDCa and a micro controller MCU which is a control device. The driver DRV includes, for example, a three-phase (u phase, v phase and w phase) inverter, and applies drive voltages Vu, Vv and Vw to three-phase drive terminals of the motor MT according to three-phase PWM (Pulse Width Modulation) signals PWMu, PWMv and PWMw from the micro controller MCU. Furthermore, the driver DRV includes a current sensor (e.g., a shunt resistor inserted in a current path in the three-phase inverter), and the current sensor outputs a current sense voltage VIS which is proportional to the current flowing to each phase.

The rotation angle sensor RSV is, for example, a variable reluctance (VR) resolver, and is attached to a rotation shaft of the motor MT and detects a rotation angle θ of the motor MT. More specifically, the rotation angle sensor RSV modulates an excitation signal VIN (e.g., a sine signal of 5 kHz in a frequency) from an outside according to the rotation angle θ of the motor MT to output a plurality of (five in this case) detection signals Vx. The resolver digital converter (semiconductor device) RDCa is constituted by, for example, one semiconductor chip, and appropriately processes the detection signal Vx to generate a detection clock signal CKd having the phase corresponding to the rotation angle θ of the motor MT.

The micro controller MCU is constituted by, for example, one semiconductor chip, and includes a processor circuit CPU, timer circuits TMRm, TMRr1 and TMRr2 and an analog-to-digital converter ADCi. The timer circuit TMRr1 outputs an excitation clock signal CKe which changes at the same frequency as that of the excitation signal VIN. The filter (lowpass filter) FLT receives an input of the excitation clock signal CKe, and outputs the excitation signal VIN. The timer TMRr2 includes a phase difference detection circuit PHDET. The phase difference detection circuit PHDET counts a phase difference between the excitation clock signal CKe and the detection clock signal CKd by using a predetermined internal clock signal (e.g., at an MHz order or more).

The analog-to-digital converter ADCi digitally converts the current sense voltage VIS from the driver DRV. The processor circuit CPU includes a position calculation circuit RPCAL, a speed calculation circuit RSCAL and a current command circuit ICMD which are realized by predetermined program processing. The position calculation circuit RPCAL calculates the rotation angle θ of the motor MT based on a count value from the phase difference detection circuit PHDET. The speed calculation circuit RSCAL calculates the rotation speed of the motor MT based on a change rate of the rotation angle θ from the position calculation circuit RPCAL.

The current command circuit ICMD calculates a current command value by PI (proportional integral) control which receives an input of an error between a rotation speed and a target rotation speed of the motor MT, and calculates a PWM duty cycle by the PI control which receives an input of the error between the current command value and a digital value (corresponding to a detection value of the motor current) from the analog-to-digital converter ADCi. The timer circuit TMRm is a PWM signal generation circuit, and generates the PWM signals PWMu, PWMv and PWMw based on a PWM duty cycle from the current command circuit ICMD.

<<Configuration and Problem of Rotation Angle Sensor (Comparative Example)>>

Figure 18A:
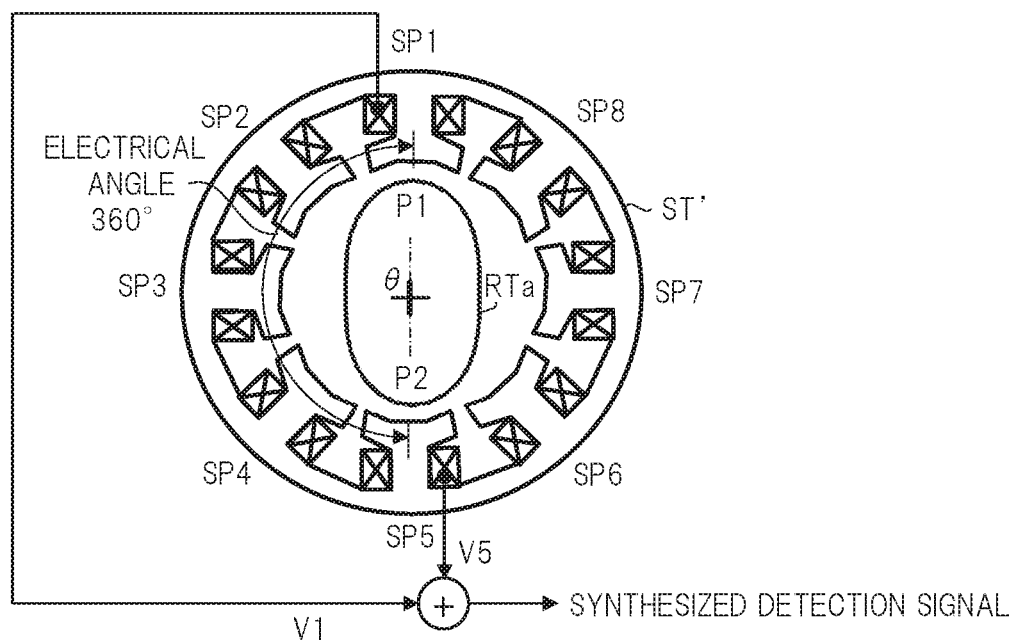
FIG. 18A is a schematic view illustrating a configuration example of a rotation angle sensor according to a comparative example of the present invention and a rotation state at a certain time.
Figure 18B:
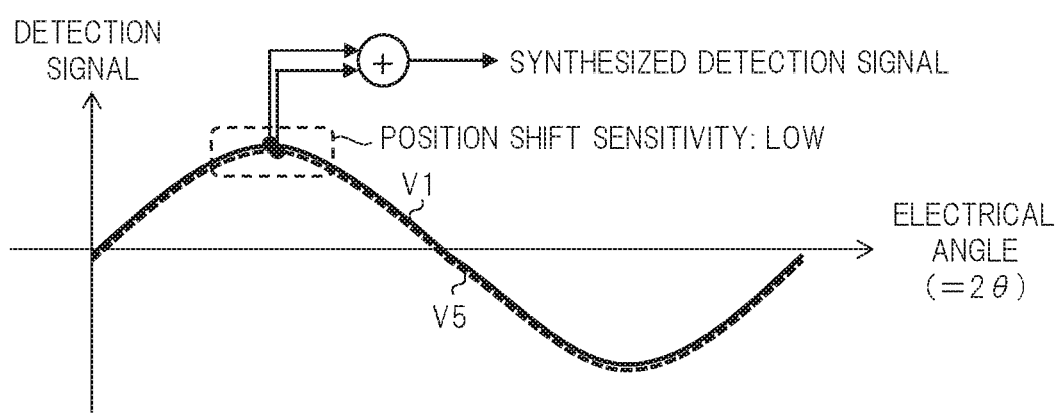
FIG. 18B is a view for explaining one example of a detecting operation in the rotation state in FIG. 18A.
Figure 19A:
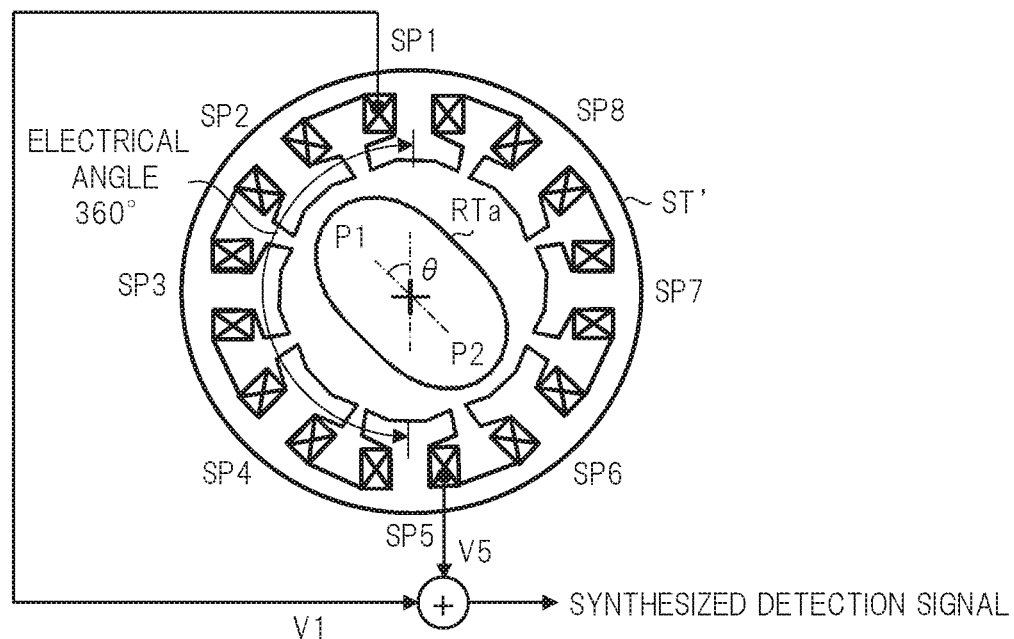
FIG. 19A is a schematic view illustrating a rotation state at a time different from that in FIG. 18A.
Figure 19B:
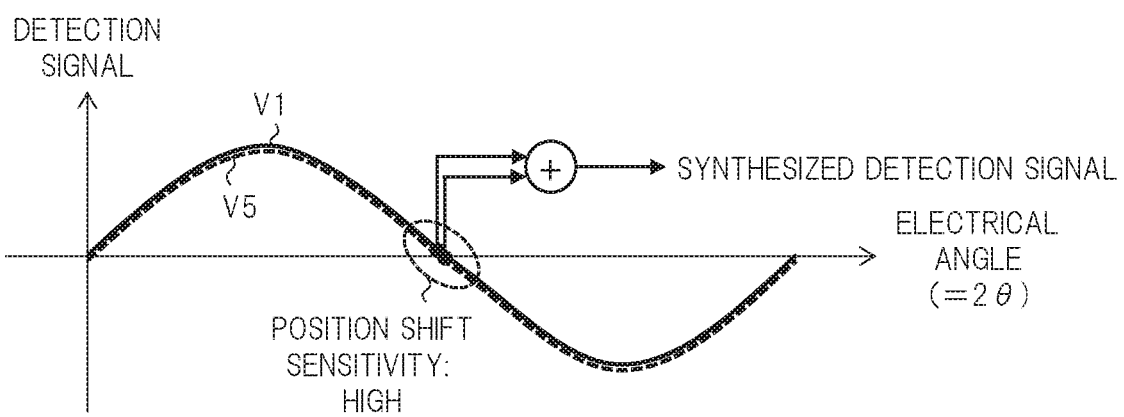
FIG. 19B is a view for explaining one example of the detecting operation in the rotation state in FIG. 19A.

FIG. 18A is a schematic view illustrating a configuration example of a rotation angle sensor according to the comparative example of the present invention and a rotation state at a certain time, and FIG. 18B is a view for explaining one example of a detecting operation in the rotation state in FIG. 18A. FIG. 19A is a schematic view illustrating a rotation state at a time different from that in FIG. 18A, and FIG. 19B is a view for explaining one example of a detecting operation in the rotation state in FIG. 19A.

The rotation angle sensor illustrated in FIGS. 18A and 19A has a shaft angle multiplier which is 2, and includes a rotor RTa which includes two poles P1 and P2, and a stator ST' on which eight salient poles SP1 to SP8 are installed. The eight salient poles SP1 to SP8 are installed in order at intervals of 45° in a mechanical angle. The eight salient poles SP1 to SP8 are respectively wound by detection coils.

When the rotor RTa rotates, a distance between each of the poles P1 and P2 of the rotor RTa and each of the salient poles SP1 to SP8 changes, and the reluctance of each detection coil and the magnitude of each detection signal eventually change in response to this change. The detection signal (V1) from each of the salient poles SP1 to SP8 (e.g., SP1) corresponds to rotation of 180° in the mechanical angle of the rotor RTa, and becomes a sine signal at 360° in an electrical angle. Furthermore, the detection signal from a neighboring salient pole is apart by 90° in the electrical angle. Thus, the electrical angle of the salient pole SP1 becomes equal to the electrical angle of the salient pole SP5, and similarly, the electrical angles of the salient poles SP2 to SP4 become equal to the electrical angles of the salient poles SP6 to SP8, respectively.

Thus, the rotation angle sensor illustrated in FIG. 18A and 19A adopts a symmetrical structure in which each salient pole is installed at a position at which the electrical angles become equal based on each of the poles P1 and P2 of the rotor RTa. For example, when the salient pole (and the detection coil) SP1 is installed at a certain electrical angle based on the pole P1 of the rotor, another salient pole SP5 is installed at the same electrical angle based on the pole P2 of the rotor. A detection signal from the rotation angle sensor is obtained by synthesizing (adding) detection signals V1 and V5 from the salient poles (detection coils) SP1 and SP5 of these equal electrical angles, and one of a sine component and a cosine component of the rotation angle θ of the rotor RTa is calculated based on the synthesized detection signal.

FIG. 18B illustrates the detection signal V1 from the detection coil of the salient pole SP1 and the detection signal V5 from the detection coil of the salient pole SP5. The detection signal V1 and the detection signal V5 have equal waveforms if there is no error cause such as a position shift. In this regard, when the distances between the poles P1 and P2 of the rotor RTa and the salient poles SP1 and SP5 are minimum according to the rotation angle θ of the rotor RTa as illustrated in FIG. 18A, for example, processing of adding a peak value of the detection signal V1 and a peak value of the detection signal V5 is performed as illustrated in FIG. 18B. Electrical angles near these peak values are electrical angles at which sensitivity with respect to a salient pole position shift is low. Hence, if the salient pole SP1 and the salient pole SP5 cause a position shift (i.e., even when the detection signals V1 and V5 slightly shift in an electrical angle direction), shift amounts of the detection signals V1 and V5 do not become great so much.

On the other hand, when the rotor RTa rotates at 45° in the mechanical angle (90° in the electrical angle) from the state in FIG. 18A as illustrated in FIG. 19A, for example, processing of adding an intermediate value of the detection signal V1 and an intermediate value of the detection signal V5 is performed as illustrated in FIG. 19B. The electrical angles near these intermediate values are electrical angles at which sensitivity with respect to a salient pole position shift is high. Hence, if the salient pole SP1 and the salient pole SP5 cause a position shift (e.g., when the detection signals V1 and V5 slightly shift in the same electrical angle direction), the individual shift amounts of the detection signals V1 and V5 become large, and a shift amount of a synthesized detection signal which is this addition result further becomes large. As a result, a detection error (more specifically, a maximum value of the detection error) of the rotation angle of the overall rotation angle sensor is concerned to become great. When the detection error becomes great, the motor MT in FIG. 1 cannot be precisely controlled in some cases.

In addition, in more detail, in the configuration in FIGS. 18A and 19A, the detection coils of the salient poles SP1 and SP5 are synthesized in addition to the detection coils of the salient poles SP3 and SP7. More specifically, the detection coils of the salient poles SP3 and SP7 are wound reversely (i.e., detection signals have an inverse polarity), and the four detection coils are connected in series. One of the sine component and the cosine component of the rotation angle θ of the rotor RTa is calculated based on both end signals of the four detection coils. Similarly, the detection coils of the salient poles SP4 and SP8 are wound reversely, and the detection coils of the salient poles SP2, SP6, SP4 and SP8 are connected in series. The other one of the sine component and the cosine component is calculated based on both end signals of the four detection coils.

In this case, for example, when the salient poles SP1 and SP5 are located at the electrical angles at which sensitivity with respect to a position shift is high as illustrated in FIGS. 19A and 19B, the salient poles SP3 and SP7 are also located at the electrical angles at which sensitivity with respect to a position shift is high. In this regard, all of the four salient poles are less likely to produce error components in an identical direction. Therefore, generally speaking, as the number of salient poles to be synthesized is increased, it is highly likely to be possible to decrease a maximum value of the detection error of the overall rotation angle sensor as a result of averaging. However, the increase in the number of salient poles to be synthesized in this way is concerned to increase manufacturing cost of the rotation angle sensor.

<<Configuration of Rotation Angle Sensor (First Embodiment)>>

Figure 2:
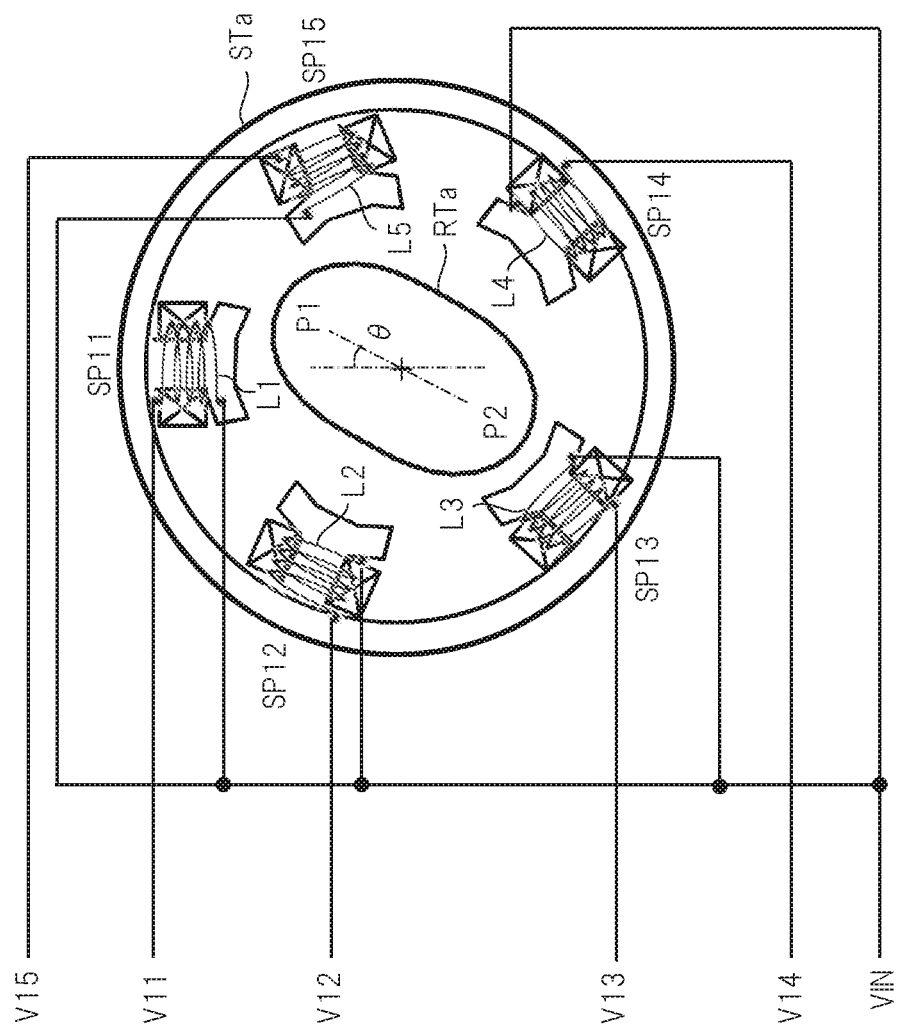
FIG. 2 is a schematic diagram illustrating a configuration example of a rotation angle sensor in FIG. 1 in the rotation angle sensor system according to the first embodiment of the present invention.

FIG. 2 is a schematic diagram illustrating a configuration example of the rotation angle sensor in FIG. 1 in the rotation angle sensor system according to the first embodiment of the present invention. The rotation angle sensor illustrated in FIG. 2 has a shaft angle multiplier which is 2, and includes the rotor RTa which includes the two poles P1 and P2, and a stator STa on which five salient poles SP11 to SP15 are installed. The five salient poles SP11 to SP15 are installed in order at intervals of 72° in the mechanical angle (144° in the electrical angle), and wound by detection coils L1 to L5, respectively. The numbers of turns of the detection coils L1 to L5 are the same. The excitation signal VIN is commonly applied to one ends of the detection coils L1 to L5. Other ends of the detection coils L1 to L5 output detection voltages V11 to V15, respectively.

Each detection signal (e.g., V11) corresponds to rotation of 180° in the mechanical angle of the rotor RTa, and becomes a sine signal of 360° in the electrical angle. Detection signals (e.g., V11 and V12) from neighboring salient poles are apart by 144° in the electrical angle. In addition, in more detail, each detection signal is a signal obtained by modulating the excitation signal VIN by the sine signal. Furthermore, although the excitation signal VIN is applied to the detection coil, each salient pole may be configured to be wound by the detection coil and an excitation coil, and, in this case, the excitation signal VIN is applied to this excitation coil.

Unlike the configuration example in FIG. 18A, the rotation angle sensor in FIG. 2 adopts an asymmetrical structure in which each salient pole is installed at a position at which electrical angles become different based on each of the salient poles SP1 and SP2 of the rotor RTa. Hence, for example, when the salient pole (and the detection coil) SP11 is installed at a certain electrical angle based on the pole P1 of the rotor, a salient pole (and the detection coil) is not installed at the same electrical angle based on the pole P2 of the rotor. In other words, the stator STa does not include a salient pole which is installed at the same electrical angle as that of the salient pole SP11 based on the pole P2 of the rotor.

<<Details of Resolver Digital Converter>>

Figure 3:
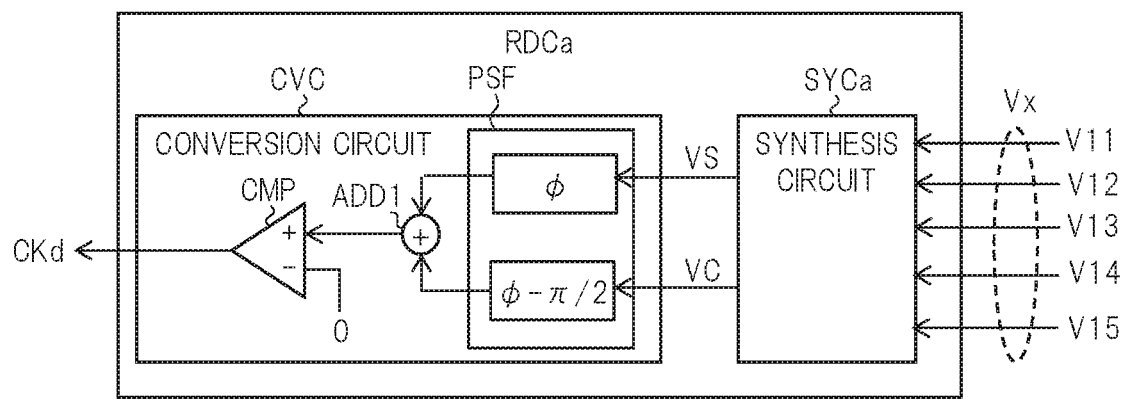
FIG. 3 is a schematic diagram illustrating a configuration example of a resolver digital converter in FIG. 1.
Figure 4:
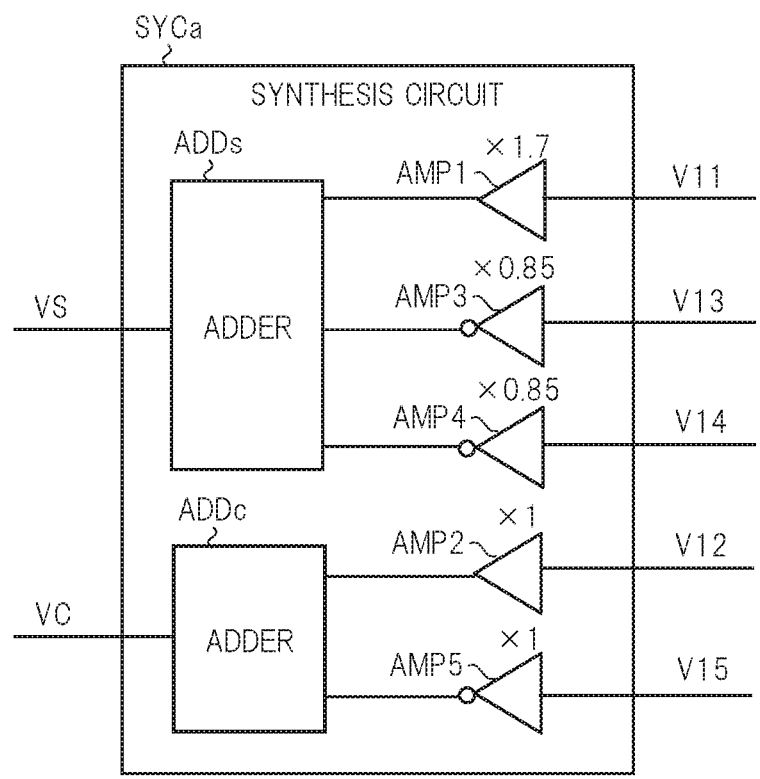
FIG. 4 is a schematic diagram illustrating a configuration example of a synthesis circuit in FIG. 3.
Figure 5:
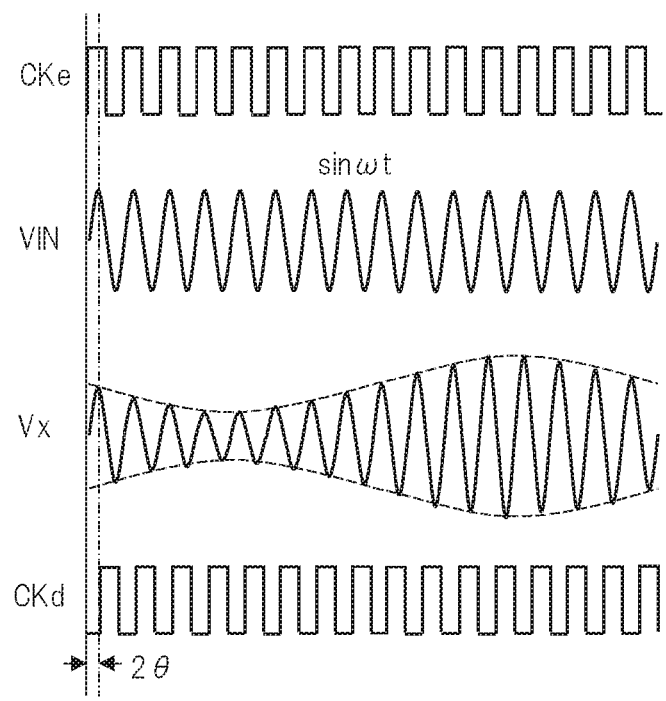
FIG. 5 is a waveform diagram illustrating a schematic operation example of the resolver digital converter in FIG. 3.

FIG. 3 is a schematic diagram illustrating a configuration example of the resolver digital converter in FIG. 1. FIG. 4 is a schematic diagram illustrating a configuration example of a synthesis circuit in FIG. 3. FIG. 5 is a waveform diagram illustrating a schematic operation example of the resolver digital converter in FIG. 3. The resolver digital converter (semiconductor device) RDCa illustrated in FIG. 3 includes a synthesis circuit SYCa and a conversion circuit CVC. The synthesis circuit SYCa selectively synthesizes the detection signals V11 to V15 from a plurality of (five in this case) detection coils L1 to L5 illustrated in FIG. 2 to generate each of synthesized detection signals VS and VC indicating the sine component and the cosine component of the rotation angle θ of the rotor RTa.

In more detail, as illustrated in FIG. 4, the synthesis circuit SYCa includes a plurality of (five in this case) amplifiers AMP1 to AMP5, an adder ADDs and an adder ADDc. A plurality of amplifiers AMP1 to AMP5 amplify the detection signals V11 to V15 from a plurality of detection coils L1 to L5 at individually preset amplification factors, respectively. The adder ADDs adds part of each output signal (output signals of AMP1, AMP3 and AMP4) from a plurality of amplifiers AMP1 to AMP5 to generate the synthesized detection signal VS indicating the sine component. The adder ADDc adds other part of each output signal (output signals of AMP2 and AMP5) from a plurality of amplifiers AMP1 to AMP5 to generate the synthesized detection signal VC indicating the cosine component.

In this regard, as is clear from FIGS. 2 and 4, the detection coil which is a target when the synthesis circuit SYCa generates the synthesized detection signal VS includes the detection coil L1 which is installed at a predetermined electrical angle (θA) based on the pole P1 of the rotor RTa, and the detection coils L3 and L4 which are installed at different electrical angles (72° (36° in the mechanical angle) based on θA) from θA based on the pole P2. In this case, unlike the case in FIG. 18A, the detection coil which is the target of the synthesis circuit SYCa does not include the detection coil which is installed at θA based on the pole P2 of the rotor RTa. In the configuration example in FIG. 2, the stator STa does not include these detection coil and salient pole.

Similarly, the detection coil which is a target when the synthesis circuit SYCa generates the synthesized detection signal VC includes the detection coil L2 which is installed at a predetermined electrical angle (θB) based on the pole P1 of the rotor RTa, and the detection coil L5 which is installed at a different electrical angle (72° based on θB) different from θB based on the pole P2. In this case, unlike the case in FIG. 18A, the detection coil which is a target of the synthesis circuit SYCa does not include a detection coil which is installed at θB based on the pole P2 of the rotor RTa. In the configuration example in FIG. 2, the stator STa does not include these detection coil and salient pole.

When this asymmetrical structure is used, the synthesis circuit SYCa cannot simply add each detection signal (e.g., V11, V13 and V14) from each detection coil which is a synthesis target, and needs to weight each detection signal at a predetermined ratio which reflects an electrical angle difference (72°) and then add each signal. Furthermore, the synthesis circuit SYCa needs to weight each of the detection signals V11 to V15 to match the amplitude of the sine component and the amplitude of the cosine component.

Hence, in this example, amplification factors of the amplifiers AMP1, AMP3 and AMP4 are set to 1.7, −0.85 and −0.85, respectively, and both of amplification factors of the amplifiers AMP2 and AMP5 are set to 1.0. As a result, the synthesized detection signal VS indicating the sine component is "VS=0.85 (2×V11−(V13+V14))", and the synthesized detection signal VC indicating the cosine component is "V12−V15". More specifically, the synthesized detection signals VS and VC are defined as follows, for example.

First, each of the detection signals V11 to V15 is set according to equation (1) to equation (5) by using the rotation angle θ of the rotor RTa, an angular frequency ω of the excitation signal VIN and constants "m" and "α" which depend on a structure of the rotation angle sensor. "m" represents a fluctuation rate of an inductance of each detection coil when the rotor RTa rotates, and "α" represents an average amplitude of a detection signal from the rotation angle sensor when the rotor RTa rotates.

$$V11 = \alpha(1 + m \times \sin(2\theta)) \times \sin(\omega t) \tag{1}$$

$$V12 = \alpha(1 + m \times \sin(2(\theta + 72°))) \times \sin(\omega t) \tag{2}$$

$$V13 = \alpha(1 + m \times \sin(2(\theta + 72° \times 2))) \times \sin(\omega t) \tag{3}$$

$$V14 = \alpha(1 + m \times \sin(2(\theta + 72° \times 3))) \times \sin(\omega t) \tag{4}$$

$$V15 = \alpha(1 + m \times \sin(2(\theta + 72° \times 4))) \times \sin(\omega t) \tag{5}$$

When VS' is calculated focusing on a θ component assuming that the sine component is expressed as "VS'=2× V11−(V13+V14)", equation (6) is obtained. Furthermore, when VC' is calculated focusing on the θ component assuming that the cosine component is expressed as "VC'=V12− V15", equation (7) is obtained.

$$\begin{aligned} VS' &= 2\sin(2\theta) - (\sin(2\theta - 72°) + \sin(2\theta - 72°)) \\ &= 2\sin(2\theta) - (2\sin(4\theta/2)\cos(-144°/2)) \\ &= 2\sin(2\theta)(1 - \cos(72°)) \end{aligned} \tag{6}$$

-continued
$$VC' = \sin(2\theta + 144°) - \sin(2\theta - 144°) \quad (7)$$
$$= 2\sin(288°/2)\cos(4\theta/2)$$
$$= 2\cos(2\theta)\sin(144°)$$

Thus, a component of sin (2θ) can be obtained from VS', and a component of cos (2θ) can be obtained from VC'. In this regard, when the amplitude of VC' is a reference (i.e., the synthesized detection signal VC is set to VC'), the amplitude of VS' becomes "(1−cos))(72°))/sin)(144°" times. Hence, in order to make the amplitude of VC' and the amplitude of VS' the same, VS' needs to be "sin)(144°)/(1−cos(72°))≈0.85" times, so that the synthesized detection signal VS is set.

In FIG. 3, the conversion circuit CVC includes a phase shifter PSF, an adder ADD1 and a comparator CMP. The phase shifter PSF shifts the phase of the excitation signal VIN included in the synthesized detection signal VC by 90°(π/2) based on the phase of the excitation signal VIN included in the synthesized detection signal VS from the synthesis circuit SYCa. In more detail, the phase shifter PSF shifts the phase of the excitation signal VIN included in the synthesized detection signal VS by "φ", and shifts the phase of the excitation signal VIN included in the synthesized detection signal VC by "φ+π/2". The adder ADD1 adds the two signals after the shift. The comparator CMP compares the signal from the adder ADD1 and zero to generate the detection clock signal CKd.

More specifically, the excitation signal VIN is first expressed by "sin(ωt)" as illustrated in FIG. 5. Each detection signal Vx (V11 to V15) is a signal obtained by modulating the excitation signal VIN according to the distance between the poles P1 and P2 of the rotor RTa. When the detection signals V11, V13 and V14 are added at a predetermined ratio, the synthesized detection signal VS from the synthesis circuit SYCa becomes a signal obtained by modulating the excitation signal VIN by "sin(2θ)" (2θ is the electrical angle of the rotor RT) and is expressed as "sin (2θ)×sin(ωt)". On the other hand, when the detection signals V12 and V15 are added at a predetermined ratio, the synthesized detection signal VC from the synthesis circuit SYCa becomes a signal obtained by modulating the excitation signal VIN by "cos (2θ)" and is expressed as "cos(2θ)× sin(ωt)".

The phase shifter PSF outputs a signal expressed as "sin(2θ) X sin(ω−φ)" when receiving the synthesized detection signal VS, and outputs a signal expressed as "cos(2θ)× sin (ωt−φ+π/2)=cos(2θ)×cos(ω−φ)" when receiving the synthesized detection signal VC. The adder ADD1 adds the two signals to output the signal expressed as "cos(ωt−φ−2θ)". That is, the adder ADD1 appropriately adjusts "φ" and outputs a signal whose frequency is the same as that of the excitation signal VIN and whose phase differs by "2θ".

The comparator CMP shapes the signal from the adder ADD1 to a square wave to generate the detection clock signal CKd. As a result, as illustrated in FIG. 5, by counting the phase difference between the excitation clock signal CKe and the detection clock signal CKd, the phase difference detection circuit PHDET in FIG. 1 can detect the electrical angle "2θ" and obtain the rotation angle (mechanical angle) θ.

<<Outline of Rotation Angle Sensor System (Modified Example)>>

Figure 6:
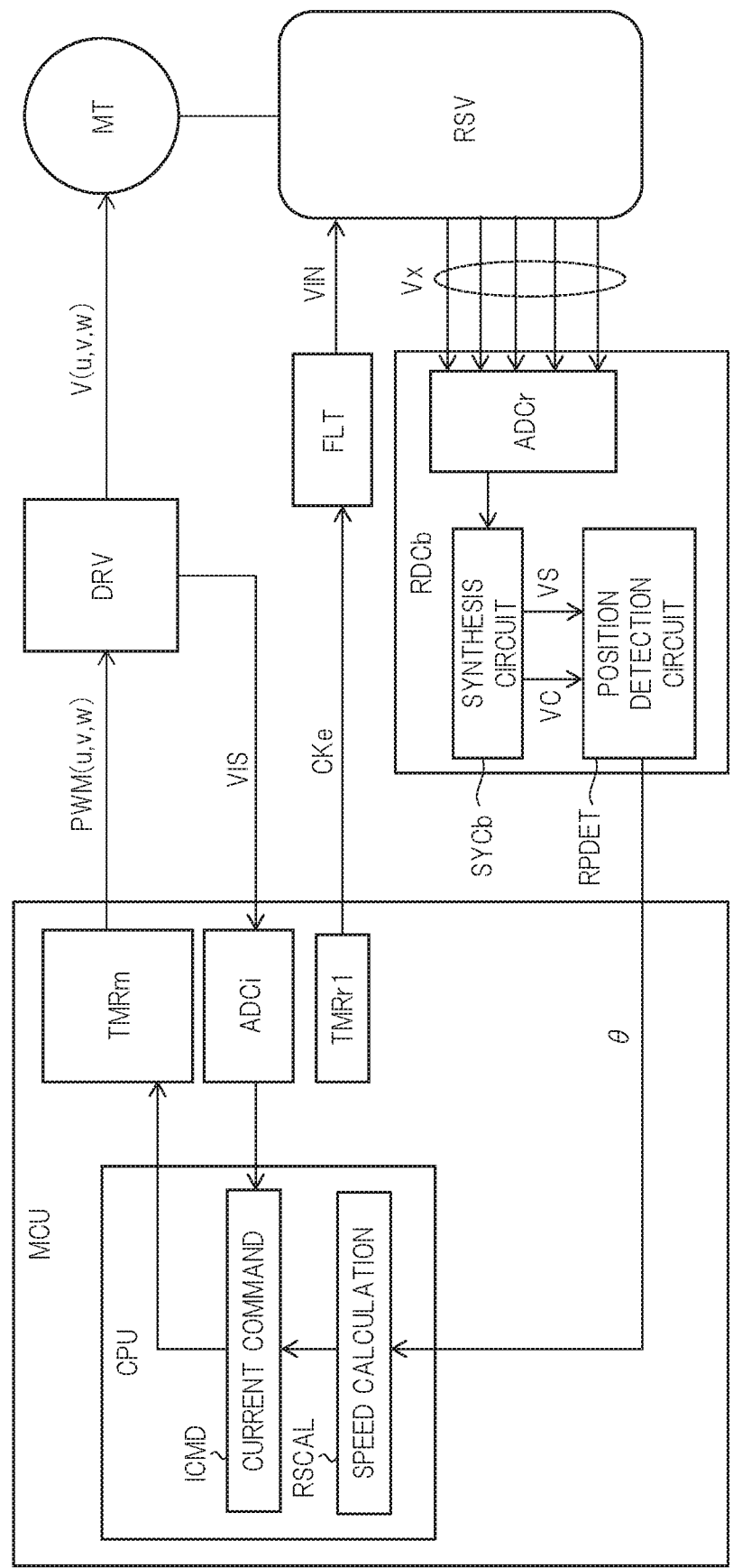
FIG. 6 is a schematic diagram illustrating a configuration example of the main units of the rotation angle sensor system modified from that in FIG. 1.

FIG. 6 is a schematic diagram illustrating a configuration example of main units of a rotation angle sensor system modified from that in FIG. 1. The rotation angle sensor system illustrated in FIG. 6 differs from the configuration example in FIG. 1 in that it includes an analog-to-digital converter ADCr, which digitally converts the detection signals Vx from a plurality of detection coils, in the resolver digital converter RDCb. Furthermore, the resolver digital converter RDCb includes a synthesis circuit SYCb which has the function illustrated in FIG. 4, and a position detection circuit RPDET. Furthermore, the micro controller MCU employs a configuration without the position calculation circuit RPCAL compared to the configuration example in FIG. 1.

The synthesis circuit SYCb is constituted by a digital circuit which receives an input of a digital value from the analog-to-digital converter ADCr. That is, the synthesis circuit SYCb performs weighting processing and addition processing described with reference to FIG. 4 by digital computation. The position detection circuit RPDET receives the synthesized detection signals VS and VC which are the digital values from the synthesis circuit SYCb, and calculates the rotation angle θ of the rotor RTa by digital computation. Various methods for calculating the rotation angle θ from the synthesized detection signals VS and VC are known, and can be also realized by digital computation using a dedicated digital circuit in some cases. By using this configuration example, it is possible to reduce a processing load of the micro controller (control device) MCU compared to the configuration example in FIG. 1.

<<Main Effect of First Embodiment>>

Figure 7A:
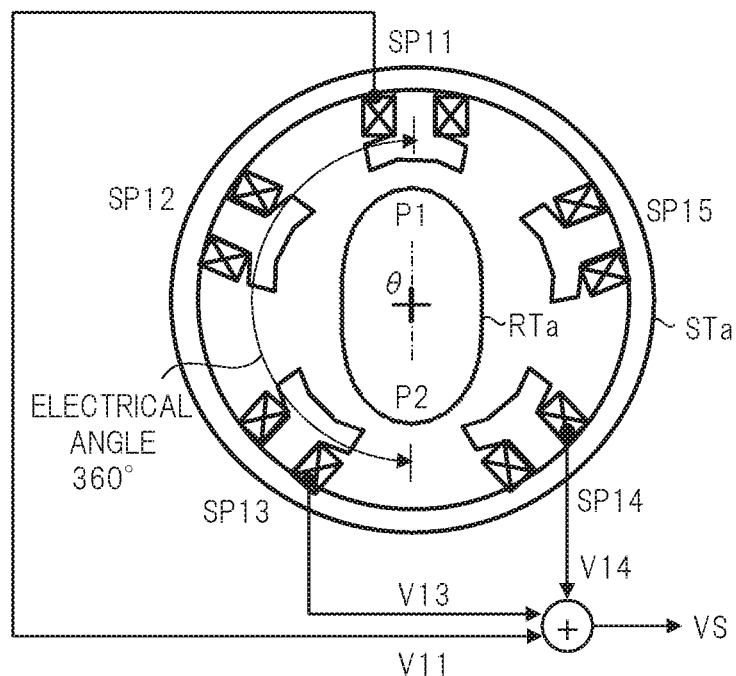
FIG. 7A is a schematic view illustrating a rotation state of the rotation angle sensor in FIG. 2 at a certain time.
Figure 7B:
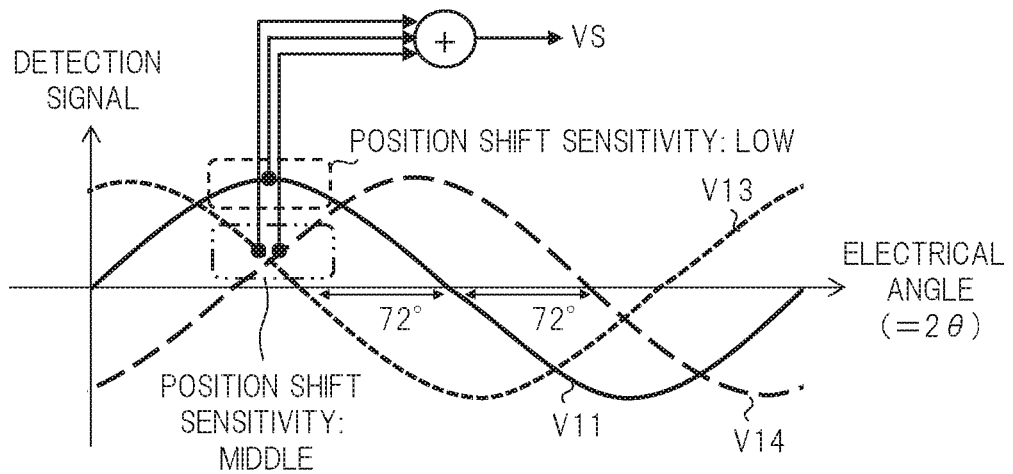
FIG. 7B is a view for explaining one example of a detecting operation in the rotation state in FIG. 7A.
Figure 8A:
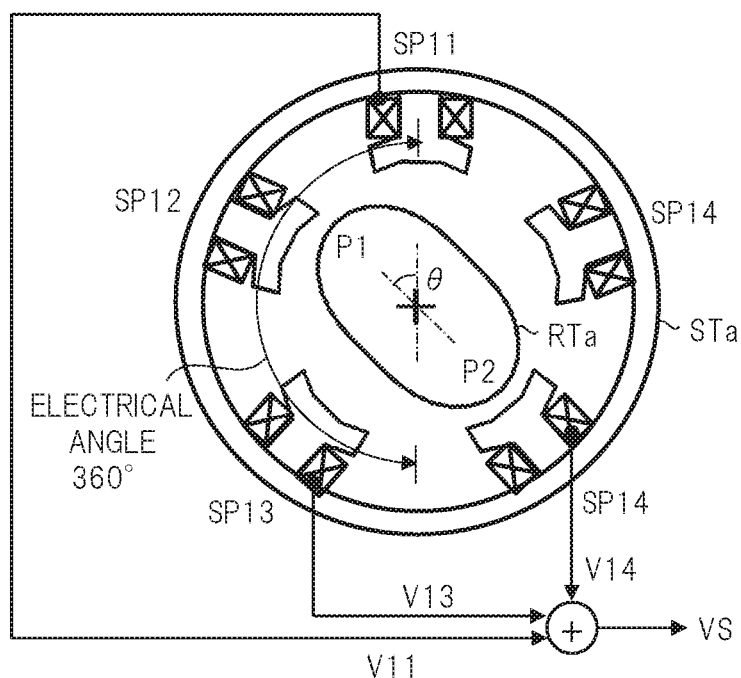
FIG. 8A is a schematic view illustrating a rotation state at a time different from that in FIG. 7A.
Figure 8B:
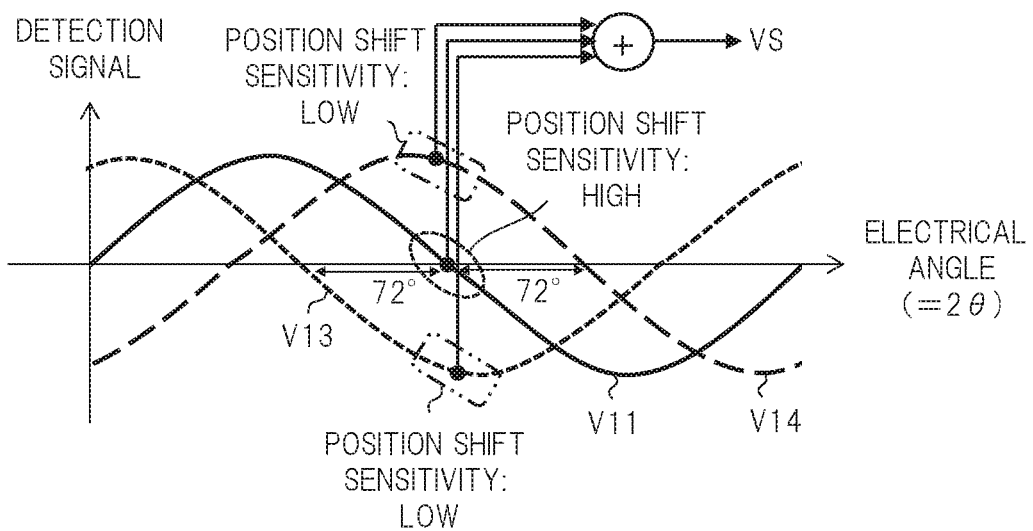
FIG. 8B is a view for explaining one example of the detecting operation in the rotation state in FIG. 8A.

FIG. 7A is a schematic view illustrating a rotation state of the rotation angle sensor in FIG. 2 at a certain time, and FIG. 7B is a view for explaining one example of a detecting operation of the rotation state in FIG. 7A. FIG. 8A is a schematic view illustrating a rotation state at a time different from that in FIG. 7A, and FIG. 8B is a view for explaining one example of a detecting operation in the rotation state in FIG. 8A.

FIG. 7B illustrates each of the detection signals V11, V13 and V14 from each of the detection coils (L1, L3 and L4) of the salient poles SP11, SP13 and SP14 which are synthesis targets of the synthesized detection signal VS. In more detail, although each of the detection signals V11, V13 and V14 includes the excitation signal VIN as illustrated in FIG. 5, the excitation signal VIN is omitted for simplicity of description. The detection signal V11 and each of the detection signals V13 and V14 differ by 72° in the electrical angle.

In FIG. 7A, like the case in FIG. 18A, the distance between the pole P1 of the rotor RTa and the salient pole SP11 is minimum according to the rotation angle θ of the rotor RTa. In this case, as illustrated in FIG. 7B, the detection coil of the salient pole SP11 outputs the detection signal V11 at the electrical angle at which position shift sensitivity is low like the case in FIG. 18B. On the other hand, the detection coils of the salient poles SP13 and SP14 output the detection signals V13 and V14, respectively, at the electrical angles at which position shift sensitivity is middle unlike the case in FIG. 18B.

Furthermore, in FIG. 8A, like the case in FIG. 19A, the rotor RTa rotates at 45° in the mechanical angle (90° in the electrical angle) from the state in FIG. 7A. In this case, as illustrated in FIG. 8B, like the case in FIG. 19B, the detection coil of the salient pole SP11 outputs the detection signal V11 at the electrical angle at which the position shift sensitivity is high. On the other hand, the detection coils of the salient poles SP13 and SP14 output the detection signals V13 and V14 at the electrical angles at which the position shift sensitivity is approximately low to middle unlike the case in FIG. 19B.

When the system according to the first embodiment (i.e., the system in which each salient pole which is a synthesis target is asymmetrically installed) is used, a situation that the detection signal at the electrical angle at which the position shift sensitivity is high and the detection signal at the electrical angle at which the position shift sensitivity is high likewise are synthesized as described with reference to FIGS. 19A and 19B does not occur. As a result, it is possible to reduce the detection error (more specifically, a maximum value of the detection error) of the rotation angle of the overall rotation angle sensor.

Figure 9:
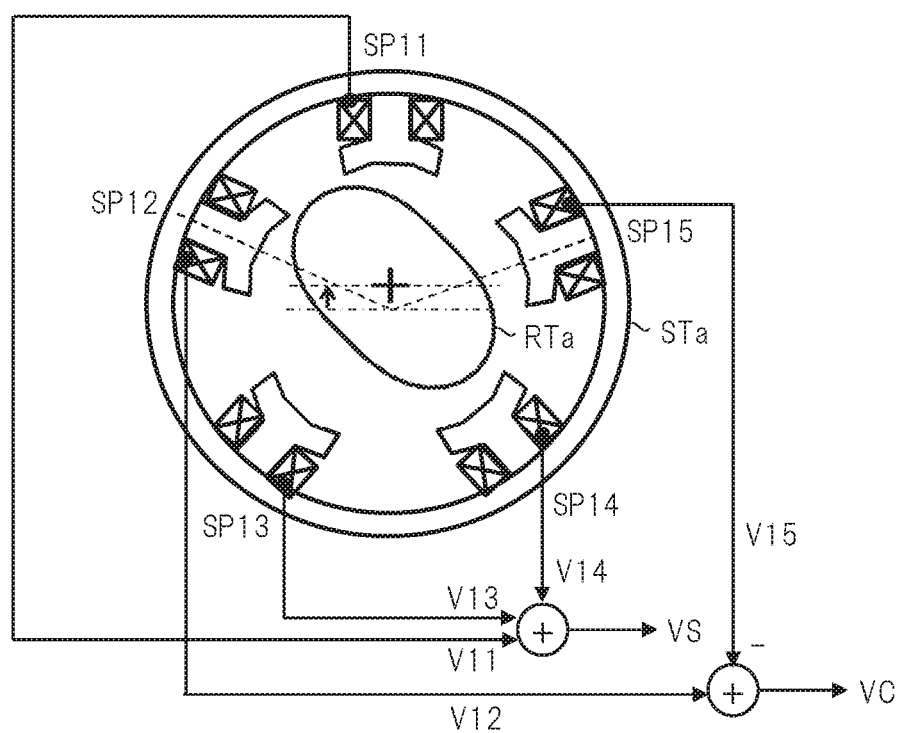
FIG. 9 is a view for explaining an influence in a case where a rotor shaft is eccentric in the rotation angle sensor in FIG. 2.

FIG. 9 is a view for explaining an influence in a case where the rotor shaft is eccentric in the rotation angle sensor in FIG. 2. In an example in FIG. 9, the rotor shaft is eccentric in a direction of the salient pole SP11. In this case, for example, the detection signal V12 and the detection signal V15 produce an error of the substantially same amount. On the other hand, when the synthesized detection signal VC is generated, a difference between the detection signal V12 and the detection signal V15 is computed, so that the error is canceled. Thus, by generating the synthesized detection signals VS and VC by synthesizing a plurality of detection signals, it is also possible to reduce a detection error accompanied by the eccentricity of the rotor shaft to some degree.

As described above, the detection error of the rotation angle θ can be reduced, so that it is possible to precisely control the motor MT in FIG. 1 (various actuators including the motor MT eventually). Furthermore, since it is possible to reduce the detection error without increasing the number of salient poles as in, for example, the configuration of the eight salient poles illustrated in FIG. 18A, it is possible to reduce the manufacturing cost of the rotation angle sensor.

Second Embodiment

<<Relationship between Salient Pole Installation Angle and Detection Error (Shaft Angle Multiplier=2)>>

Figure 10A:
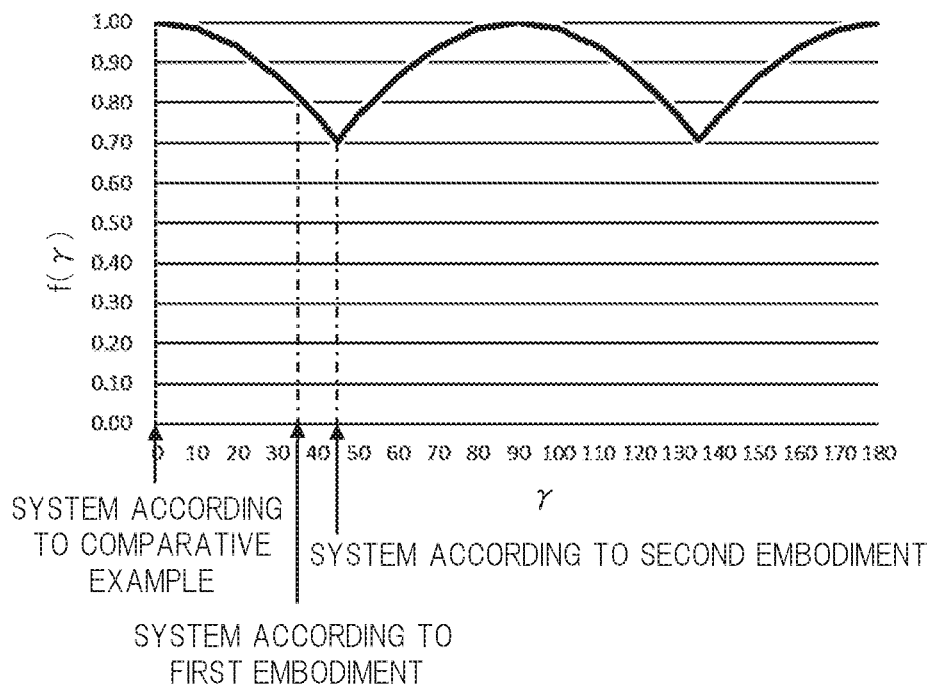
FIG. 10A is a view illustrating one example of a result obtained by verifying a relationship between a salient pole installation angle and a detection error in the rotation angle sensor whose shaft angle multiplier is 2.
Figure 10B:
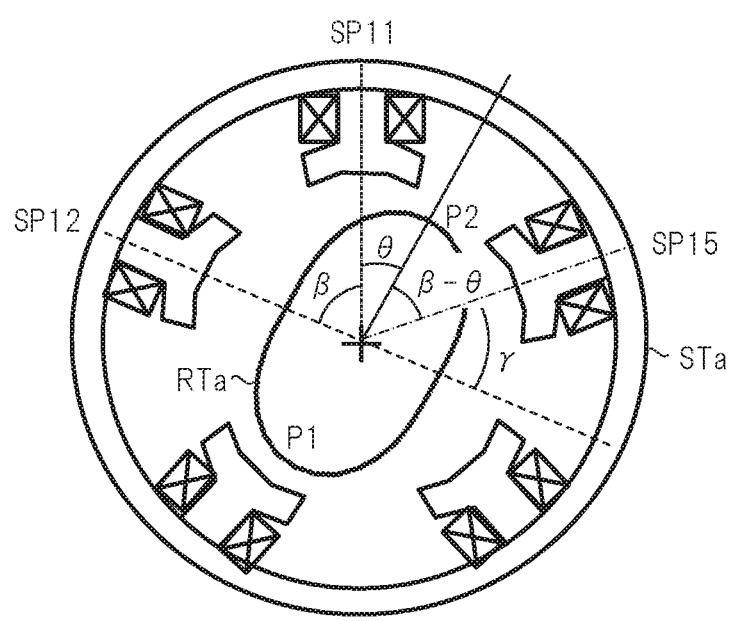
FIG. 10B is a supplemental view of FIG. 10A.

FIG. 10A is a view illustrating one example of a result obtained by verifying a relationship between a salient pole installation angle and a detection error in the rotation angle sensor whose shaft angle multiplier is 2, and FIG. 10B is a supplemental view of FIG. 10A. FIG. 10B illustrates the rotation angle sensor illustrated in FIG. 2. In FIG. 10B, "γ" represents a difference between an installation angle (a mechanical angle in this case) of the salient pole SP12 based on the pole P1 of the rotor RTa and an installation angle of the salient pole SP15 based on the pole P2, β represents a mechanical angle between neighboring salient poles, and "θ" represents a rotation angle (mechanical angle) of the rotor RT.

A case where the synthesized detection signal VC is generated by synthesizing each detection signal (V12 and V15) from each detection coil of the salient poles SP12 and SP15 will be considered. In this case, the synthesized detection signal VC is calculated according to equation (8). Each coefficient ("m" and "α") in equation (8) is the same as those in equation (1). On the other hand, when the installation angles of the salient poles SP12 and SP15 shift in equation (8), "θ" of the salient pole SP12 becomes "θ1" and "θ" of the salient pole SP15 becomes "θ2" as indicated in equation (9).

$$VC=VB-VE=\alpha(1+m\times\sin(\omega t)\cos 2(\theta+\alpha))-\alpha(1+m\times\sin(\omega t)\cos 2(\gamma-\theta+\beta)) \quad (8)$$

$$VC=\alpha\times m\times\sin(\omega t)(\cos 2(\theta 1-\beta)-\cos 2(\gamma-\theta 2+\beta)) \quad (9)$$

A maximum error in a range of 0≤θ(θ1, θ2)≤360° of the synthesized detection signal VC indicated in equation (9) is a function f(γ) which depends on "γ" as indicated in equation (10). "A" in equation (10) represents a constant set such that f(0)=1 holds.

$$f(\gamma)=A(\max(\partial V2/\partial \theta 1)+\max(\partial V2/\partial \theta 2)) \quad (10)$$

FIG. 10A illustrates a result obtained by computing f(γ) of equation (10) within the range of 0≤γ≤180°. As is clear from FIG. 10A, when the configuration example (the configuration of γ=36°) in FIG. 2 described in the first embodiment is used, it is possible to reduce the maximum error of a position shift of a salient pole (and a detection coil) by approximately 20% compared to a case where the configuration (the configuration of γ=0°) in FIG. 18A which is the comparative example is used. In addition, the synthesized detection signal VC indicating the cosine component has been described as an example here, but the synthesized detection signal VS indicating the sine component also provides the same effect.

<<Configuration around Rotation Angle Sensor (Second Embodiment)>>

Figure 11:
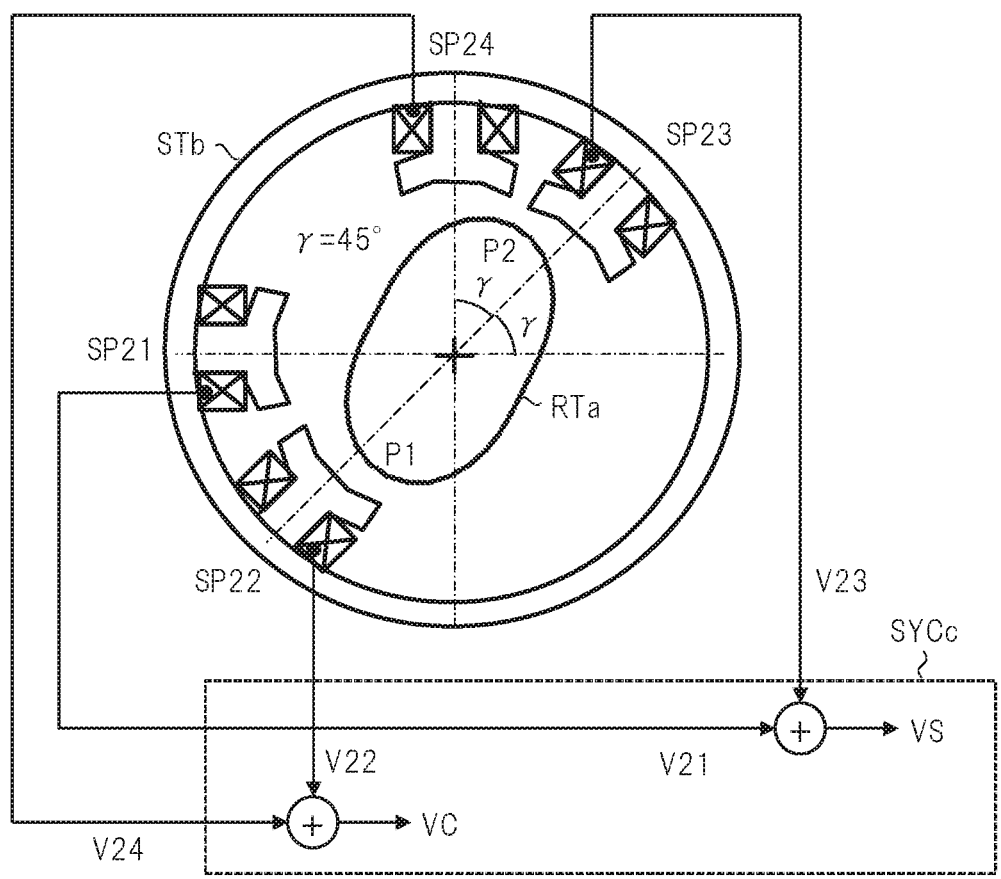
FIG. 11 is a schematic diagram illustrating a configuration example around the rotation angle sensor in FIG. 1 in a rotation angle sensor according to a second embodiment of the present invention.

FIG. 11 is a schematic diagram illustrating the configuration example around the rotation angle sensor in FIG. 1 in the rotation angle sensor system according to the second embodiment of the present invention. The rotation angle sensor illustrated in FIG. 11 differs in the configuration of a stator STb from the above-described configuration example in FIG. 2. Four salient poles SP21 to SP24 are installed on the stator STb. The salient pole SP23 is installed at a position apart by 135° in the mechanical angle based on the salient pole SP21. The salient pole SP22 is installed at a position apart by 45° in the mechanical angle based on the salient pole SP21. The salient pole SP24 is installed at a position apart by 135° in the mechanical angle based on the salient pole SP22.

A synthesis circuit SYCc synthesizes detection signals V21 and V23 from respective detection coils respectively wound around the salient pole SP21 and the salient pole SP23 at a predetermined ratio to generate the synthesized detection signal VS of the sine component. Furthermore, the synthesis circuit SYCc synthesizes detection signals V22 and V24 from respective detection coils respectively wound around the salient pole SP22 and the salient pole SP24 at a predetermined ratio to generate the synthesized detection signal VC of the cosine component.

Thus, the detection coils which are targets when the synthesis circuit SYCc generates the synthesized detection signal VS include the detection coil of the salient pole SP21 installed at a predetermined electrical angle (θA) based on the pole P1 of the rotor RTa, and the detection coil of the salient pole SP23 installed at an electrical angle (90° (45° in the mechanical angle) based on θA) different from θA based on the pole P2. In this case, the detection coil which is a target of the synthesis circuit SYCc does not include a detection coil which is installed at θA based on the pole P2 of the rotor RTa like the case of the first embodiment. In the configuration example in FIG. 11, the stator STb does not include these detection coil and salient pole.

Similarly, the detection coils which are targets when the synthesis circuit SYCc generates the synthesized detection signal VC include the detection coil of the salient pole SP22 installed at a predetermined electrical angle (θB) based on the pole P1 of the rotor RTa, and the detection coil of the salient pole SP24 installed at an electrical angle (90° (45° in the mechanical angle) based on θB) different from θB based on the pole P2. In this case, the detection coil which is a target of the synthesis circuit SYCc does not include a detection coil which is installed at θB based on the pole P2 of the rotor RTa like the case of the first embodiment. Although the stator STb includes these salient pole SP23 and detection coil in the configuration example in FIG. 11, the detection coil is excluded from the synthesis target of the synthesized detection signal VC.

A configuration example in FIG. 11 corresponds to the configuration of γ=45° illustrated in FIG. 10A. Consequently, it is possible to further reduce a detection error of a rotation angle accompanied by a salient pole position shift compared to the configuration example of the first embodiment (FIG. 2). Furthermore, the number of salient poles becomes smaller compared to the configuration example in FIG. 2, so that it is possible to further reduce the manufacturing cost in some cases. However, in the configuration example in FIG. 11, there is a possibility that the detection error accompanied by the eccentricity of the rotor shaft cannot be sufficiently reduced, and therefore the configuration example in FIG. 2 where each salient pole is equally installed is desirable from this viewpoint. In addition, FIGS. 2 and 11 illustrate the case where γ is 36° and the case where γ is 45°. However, as is clear from FIG. 10A, even when γ is in a range of 10° to 36° (the electrical angle is 20° to 72°) or in a range of 36° to 45° (the electrical angle is 72° to 90°, the effect can be obtained compared to a case of γ=0°.

<<Relationship between Salient Pole Installation Angle and Detection Error (Shaft Angle Multiplier=3)>>

Figure 12A:
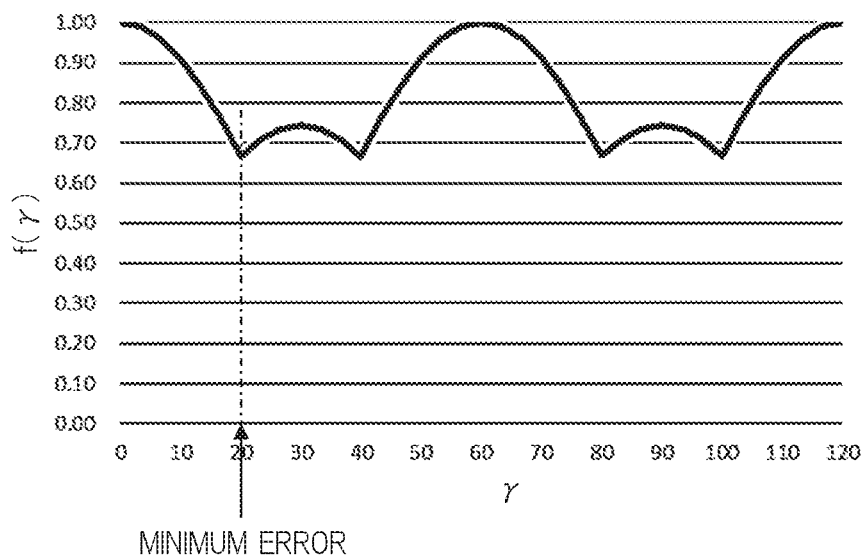
FIG. 12A is a view illustrating one example of a result obtained by verifying a relationship between a salient pole installation angle and a detection error in the rotation angle sensor whose shaft angle multiplier is 3.
Figure 12B:
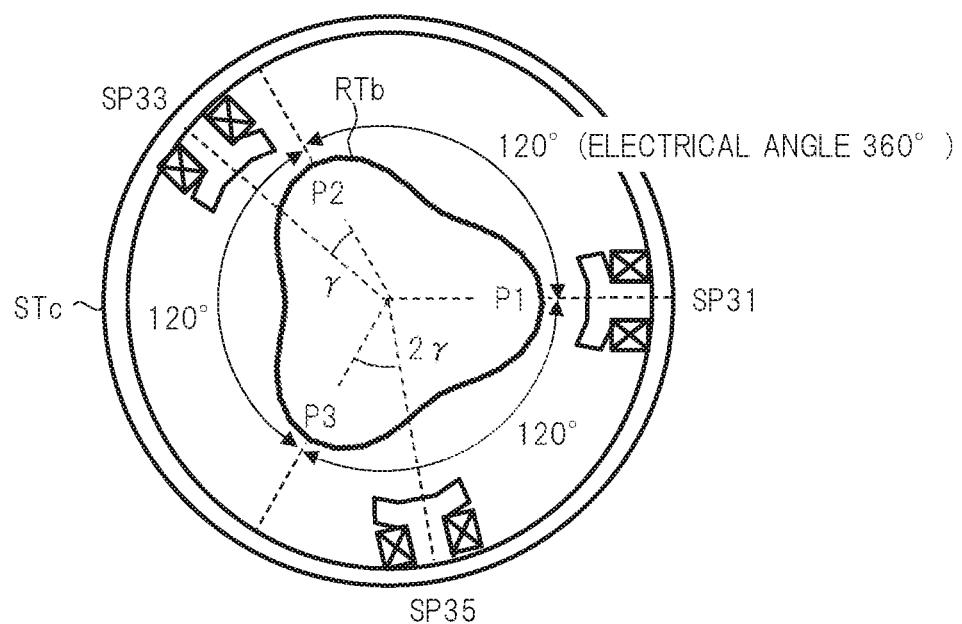
FIG. 12B is a supplemental view of FIG. 12A.

FIG. 12A is a view illustrating one example of a result obtained by verifying a relationship between a salient pole installation angle and a detection error in the rotation angle sensor whose shaft angle multiplier is 3, and FIG. 12B is a supplemental view of FIG. 12A. In FIG. 12B, three salient poles SP31, SP33 and SP35 are installed so as to correspond to three poles P1, P2 and P3 of a rotor RTb, respectively. "γ" represents a difference between an installation angle (the mechanical angle in this case) of the salient pole SP31 based on the pole P1 of the rotor RTb and an installation angle of the salient pole SP33 based on the pole P2, and also a difference between the installation angle of the salient pole SP33 based on the pole P2 and an installation angle of the salient pole SP35 based on the pole P3. In this case, when the salient pole SP31 is 0°, the salient pole SP33 is installed at (120+γ)°, and the salient pole SP35 is installed at (240+2γ)°.

Hereinafter, a case where each detection signal from each detection coil of the salient poles SP31, SP33 and SP35 is synthesized to generate a synthesized detection signal will be considered. That is, f(γ) is calculated assuming the configuration in FIG. 12B like the cases in FIGS. 10A and 10B. FIG. 12A illustrates a calculation result of f(γ) in a range of 0≤γ≤120°. Based on FIG. 12A, a detection error of a rotation angle can be minimized in a case of γ=20°.

<<Configuration around Rotation Angle Sensor (Application Example)>>

Figure 13:
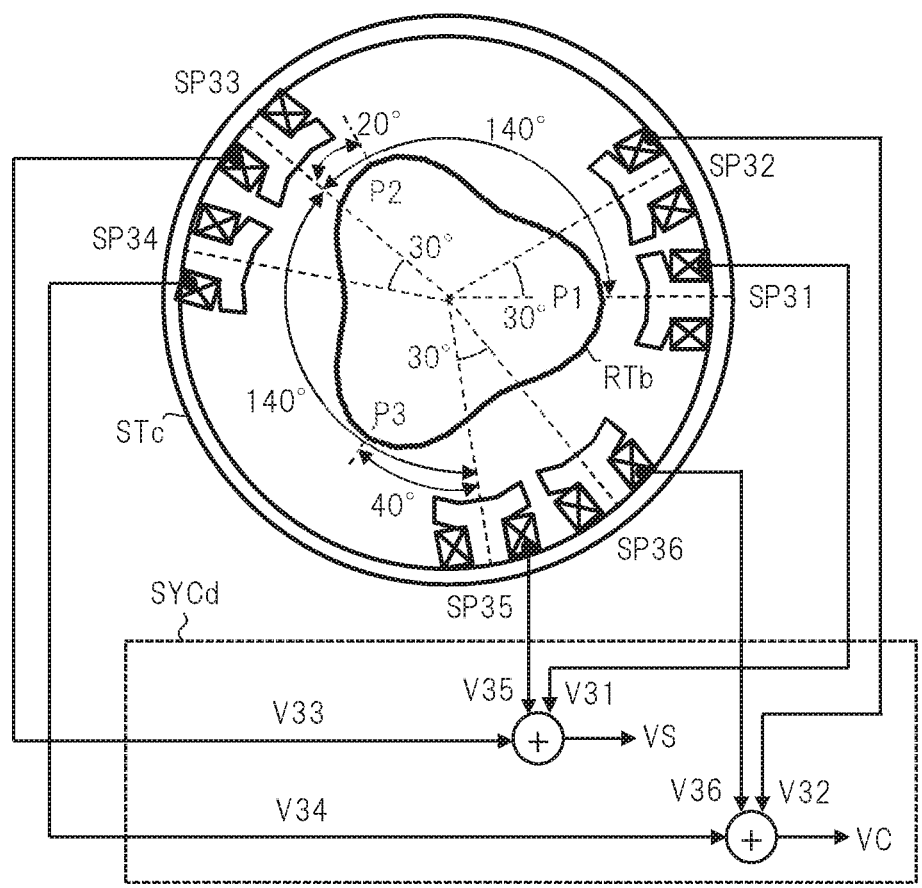
FIG. 13 is a schematic diagram illustrating a configuration example around the rotation angle sensor different from that in FIG. 11 in the rotation angle sensor system according to the second embodiment of the present invention.

FIG. 13 is a schematic diagram illustrating a different configuration example around the rotation angle sensor from that in FIG. 11 in the rotation angle sensor system according to the second embodiment of the present invention. Each salient pole is installed at γ=20° in the rotation angle sensor illustrated in FIG. 13 based on FIG. 12A. In FIG. 13, a stator STc includes six salient poles SP31 to SP36. The salient pole SP33 is installed at a position apart by 140° in the mechanical angle based on the salient pole SP31. The salient pole SP35 is installed at a position apart by 140° in the mechanical angle based on the salient pole SP33. The salient pole SP32 is installed at a position apart by 30° in the mechanical angle based on the salient pole SP31. The salient pole SP34 is installed at a position apart by 140° in the mechanical angle based on the salient pole SP32. The salient pole SP36 is installed at a position apart by 140° in the mechanical angle based on the salient pole SP34.

A synthesis circuit SYCd synthesizes the detection signals V31, V33 and V35 from respective detection coils respectively wound around the salient poles SP31, SP33 and SP35 at a predetermined ratio to generate the synthesized detection signal VS of the sine component. Furthermore, the synthesis circuit SYCd synthesizes detection signals V32, V34 and V36 from respective detection coils respectively wound around the salient poles SP32, SP34 and SP36 at a predetermined ratio to generate the synthesized detection signal VC of the cosine component.

Thus, the salient poles which are the synthesis targets of the synthesized detection signal VS include the salient pole SP31 which is installed at a predetermined electrical angle (θA1) based on the pole P1, the salient pole SP33 which is installed at a different electrical angle (θA2) from θA1 based on the pole P2, and the salient pole SP35 which is installed at a different electrical angle (θA3) from θA1 and θA2 based on the pole P3. The salient pole SP33 is installed at 40° (20° in the mechanical angle) based on θA1, and the salient pole SP35 is installed at 80° (40° in the mechanical angle) based on θA1. In this case, like the case in the first embodiment, the salient poles which are synthesis targets of the synthesized detection signal VS do not include the detection coils installed at θA1 and θA3 based on the pole P2, and the detection coils installed at θA1 and θA2 based on the pole P3. The same applies to the salient poles which are synthesis targets of the synthesized detection signal VC.

<<Main Effect of Second Embodiment>>

As described above, by using the rotation angle sensor according to the second embodiment, it is possible to obtain the same effect as that in the first embodiment. Furthermore, it is possible to further reduce a rotation error and further reduce manufacturing cost in some cases compared to the first embodiment.

Third Embodiment

<<Outline of Rotation Angle Sensor System (Application Example)>>

Figure 14:
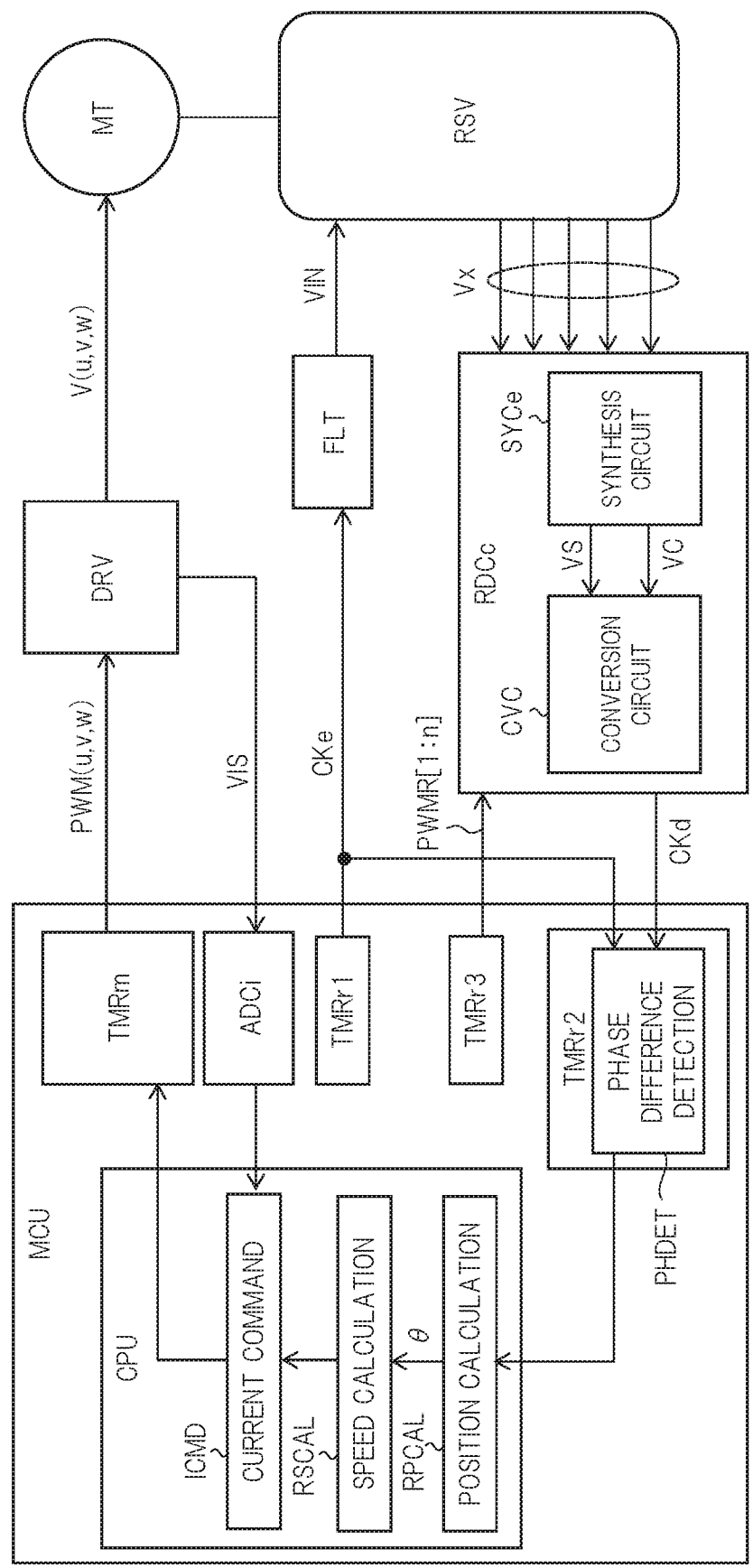
FIG. 14 is a schematic diagram illustrating a configuration example of main units of a rotation angle sensor system according to a third embodiment of the present invention.

FIG. 14 is a schematic diagram illustrating a configuration example of main units of the rotation angle sensor system according to the third embodiment of the present invention. The rotation angle sensor system illustrated in FIG. 14 differs in the following points from the configuration example in FIG. 1. The first point is that a resolver digital converter (semiconductor device) RDCc includes a synthesis circuit SYCe different from that in FIG. 4. The second point is that the micro controller MCU includes a timer circuit (PWM signal generation circuit) TMRr3 which generates PWM signals PWMR [1] to PWMR [ n].

<<Configuration of Synthesis Circuit (Application Example) >>

Figure 15:
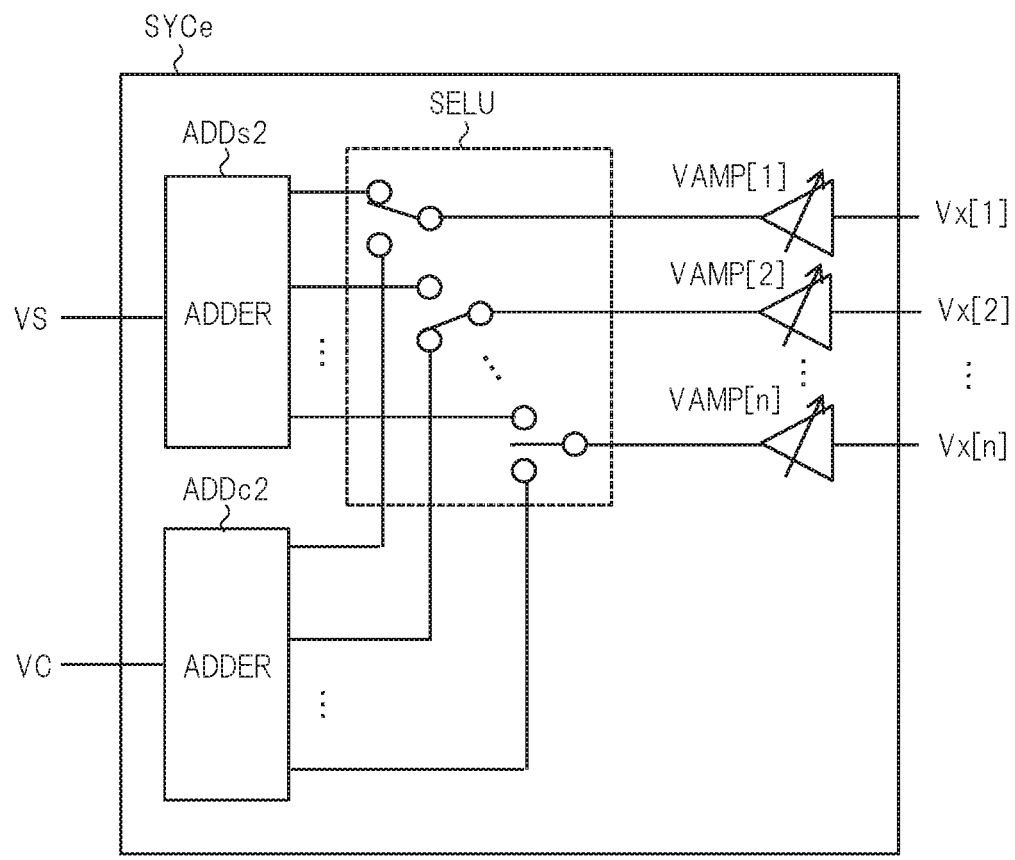
FIG. 15 is a schematic diagram illustrating a configuration example of a synthesis circuit in FIG. 14.

FIG. 15 is a schematic diagram illustrating a configuration example of the synthesis circuit in FIG. 14. When the rotation angle sensor of the asymmetrical structure as illustrated in FIGS. 2, 11 and 13 described above is used, the synthesis circuit needs to weight each detection signal from the rotation angle sensor at an appropriate ratio. This appropriate ratio may change as appropriate according to the structure of the rotation angle sensor. In this case, a generalpurpose synthesis circuit which can support the rotation angle sensor of various structures is required.

Hence, the synthesis circuit SYCe illustrated in FIG. 15 includes n variable amplifiers VAMP[1] to VAMP [n], a selection circuit SELU and adders ADDs2 and ADDc2. The n variable amplifiers VAMP[1] to VAMP[n] can be variably set amplification factors individually, and amplify n detection signals Vx [1] to Vx [n], respectively. The selection circuit SELU transmits part of each output signal from the n variable amplifiers VAMP [1] to VAMP [n] to the adder ADDs2, and transmits the other part to the adder ADDc2 according to a selection signal.

The adder ADDs2 adds part of above-mentioned each output signal from the selection circuit SELU to generate the synthesized detection signal VS indicating the sine component. The adder ADDc2 adds other part of above-mentioned each output signal from the selection circuit SELU to generate the synthesized detection signal VC indicating the cosine component. In addition, for example, when the detection signal Vx [n] is not used according to the structure of the rotation angle sensor, the amplification factor of the variable amplifier VAMP[n] may be zero, and the selection circuit SELU may not transmit the output signal of the variable amplifier VAMP[n] to the adders ADDs2 and ADDc2.

Figure 16:
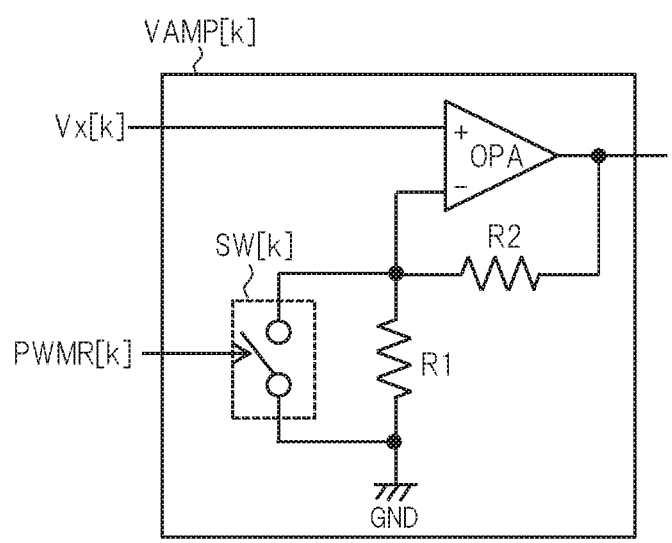
FIG. 16 is a circuit diagram illustrating a configuration example of a variable amplifier in FIG. 15.

FIG. 16 is a circuit diagram illustrating a configuration example of the variable amplifier in FIG. 15. The variable amplifier VAMP [k] (k=1 to n) illustrated in FIG. 16 includes resistance elements R1 and R2, an operational amplifier circuit OPA which performs an amplifying operation at an amplification factor determined based on resistance values of the resistance elements R1 and R2, and a switch element SW [k]. The switch element SW [k] is constituted by, for example, a MOS transistor. The switch element SW [k] is coupled to both ends of one resistance element (R1 in this example) of the resistance elements R1 and R2, and is controlled to switch on and off according to a PWM signal PWMR[k] from the micro controller MCU.

Thus, an effective resistance value of the resistance element R1 is a result obtained by multiplying the resistance value of the resistance element R1 with a PWM duty cycle of the PWM signal PWMR[k]. Hence, the micro controller MCU can arbitrarily set the amplification factor of the variable amplifier VAMP [k] via the PWM signal PWMR[k].

<<Main Effect of Third Embodiment>>

As described above, by using the rotation angle sensor system according to the third embodiment, it is possible to obtain the same effect as that in the first and second embodiments. Furthermore, it is possible to provide versatility to the resolver digital converter assuming that the rotation angle sensors according to the first and second embodiments are used. Furthermore, by using the variable amplifier in FIG. 16, it is possible to reduce a circuit area of the resolver digital converter, and improve setting accuracy of amplification factor (reduce the detection error of the rotation angle eventually) in some cases.

That is, when the systems according to the first and second embodiments are used, setting accuracy of amplification factor needs to be high in order to obtain an effect of reducing the detection error of the rotation angle. As a system which variably sets an amplification factor, a system which selectively uses a plurality of resistance elements has been known. Setting the amplification factor precisely with a high resolution by using this system requires multiple resistance elements. On the other hand, when the system in FIG. 16 is used, the amplification factor can be set by one switch element, so that it is possible to reduce the circuit area compared to a case where the multiple resistance elements are used.

Furthermore, the setting resolution of amplification factor is determined based on a resolution of the PWM duty cycle. Generally, the micro controller MCU can usually set the PWM duty cycle with a high resolution, and consequently can increase the setting resolution of amplification factor by taking advantage of this setting. Also, when the variable amplifiers are used, even if the number of turns of each detection coil (e.g., L1 to L5 in FIG. 2) varies, an error caused by this variation can be corrected together. In addition, the variable amplifier in FIG. 16 can be applied to each of the amplifiers AMP1 to AMP5 in FIG. 4. In this case, it is possible to trim the error of the amplification factor of each of the amplifiers AMP1 to AMP5.

Fourth Embodiment

<<Configuration of Detection Coil>>

Figure 17:
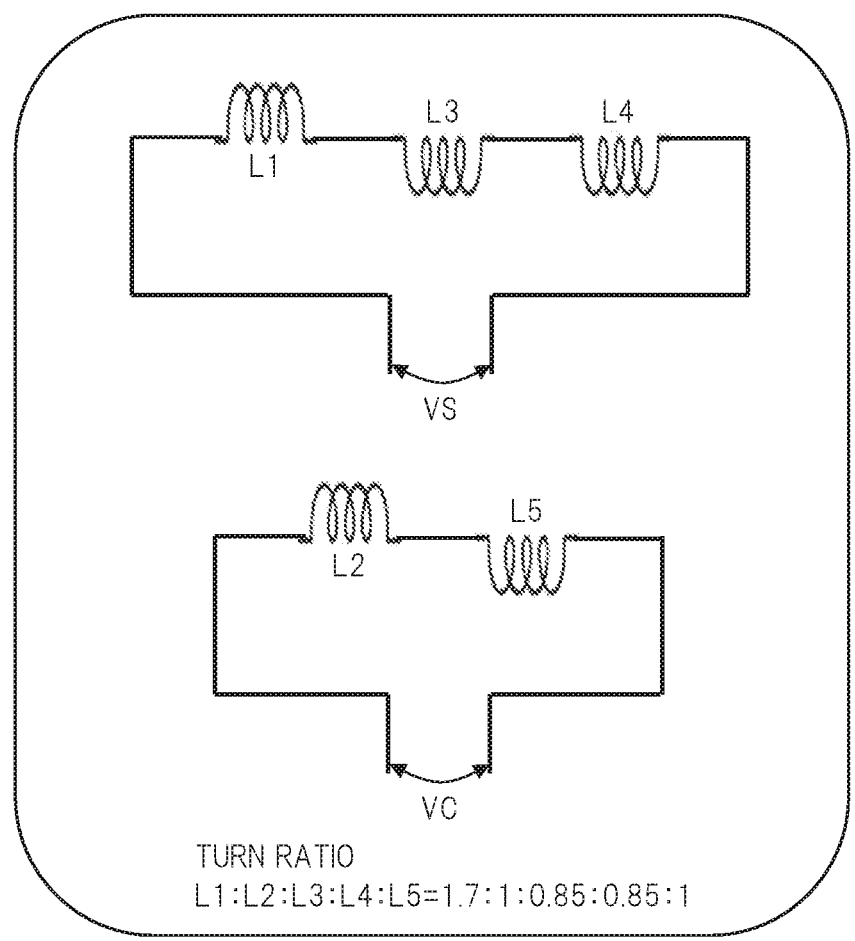
FIG. 17 is a schematic view illustrating a configuration example different from that in FIG. 2 in each detection coil included in the rotation angle sensor in FIG. 2 in a rotation angle sensor system according to a fourth embodiment of the present invention.

FIG. 17 is a schematic view illustrating a different configuration from that in FIG. 2 in each detection coil included in the rotation angle sensor in FIG. 2 in the rotation angle sensor system according to the fourth embodiment of the present invention. The synthesis circuit SYCa in FIG. 4 weights each of the detection signals V11 to V15 by using a plurality of amplifiers AMP1 to AMP5, but can also weight each detection signal according to the number of turns of each of the detection coils L1 to L5 (FIG. 2).

In the example in FIG. 17, in order to obtain the synthesized detection signal VS(=0.85(2×V11−(V13+V14))) illustrated in FIG. 3, the detection coils L3 and L4 are wound reversely (i.e., the detection signals V13 and V14 have the inverse polarity), and then the detection coils L1, L3 and L4 are connected in series. The turn ratio of the detection coils L1, L3 and L4 in this case is "L1:L3:L4=1.7:0.85:0.85". Similarly, in order to obtain the synthesized detection signal VC(=V12 to V15), the detection coil L5 is wound reversely (i.e., the detection signal V15 has the inverse polarity), and then the detection coils L2 and L5 are connected in series. The turn ratio of the detection coils L2 and L5 in this case is "L2:L5=1.0:1.0".

<<Main Effect of Fourth Embodiment>>

As described above, by using the rotation angle sensor system according to the fourth embodiment, it is possible to obtain the same effect as that in the first and second embodiments. Furthermore, the synthesis circuit SYCa as illustrated in FIG. 4 is unnecessary, so that it is possible to reduce the circuit area of the resolver digital converter. In this regard, it is not practically easy to finely adjust the turn ratio or an error of the turn ratio occurs to some degree in some cases. From this viewpoint, it is beneficial to provide the synthesis circuit as illustrated in FIG. 4 (or FIG. 15).

In addition, although the configuration in which each detection coil is connected in series has been described above, each detection coil can be configured to individually output a detection signal in a state where a turn ratio is changed, and the synthesis circuit can also be configured to add the detection signal without amplifying the detection signal. In this case, the synthesis circuit may include a variable amplifier for correcting an error of the turn ratio.

In the foregoing, the invention made by the inventors of the present invention has been concretely described based on the embodiments. However, it is needless to say that the present invention is not limited to the foregoing embodiments and various modifications and alterations can be made within the scope of the present invention. For example, the embodiments above have been described in detail in order to make the present invention easily understood, and the present invention is not always limited to the embodiment including all the described configurations. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

What is claimed is:

1. A rotation angle sensor system, comprising:
   a rotation angle sensor including 1) a rotor having a first pole and a second pole and 2) a stator having a plurality of salient poles wound by detection coils, respectively; and
   a synthesis circuit configured to generate a first synthesized detection signal and a second synthesized detection signal based on detection signals from at least two of the detection coils, respectively,
   wherein the salient poles are installed at different electrical angles based on the first pole and the second pole, respectively,
   wherein the rotation angle sensor comprises a shaft angle multiplier of 2,
   wherein, when the stator has five salient poles including a first salient pole, a second salient pole, a third salient pole, a fourth salient pole and a fifth salient pole installed in order at a mechanical angle interval of 72°, the synthesis circuit synthesizes detection signals from the detection coils respectively wound around the first salient pole, the third salient pole, and the fourth salient pole to generate one of the first synthesized detection signal and the second synthesized detection signal, and synthesizes detection signals from the detection coils respectively wound around the second salient pole and the fifth salient pole to generate the other one of the first synthesized detection signal and the second synthesized detection signal, and
   wherein, when the stator has four salient poles including a sixth salient pole, a seventh salient pole installed at a position apart by 135° in a mechanical angle based on the sixth salient pole, an eighth salient pole installed at a position apart by 45° in the mechanical angle based on the sixth salient pole, and a ninth salient pole installed at a position apart by 135° in the mechanical angle based on the eighth salient pole, the synthesis circuit synthesizes detection signals from the detection coils respectively wound around the sixth salient pole and the seventh salient pole to generate one of the first synthesized detection signal and the second synthesized detection signal, and synthesizes detection signals from the detection coils respectively wound around the eighth salient pole and the ninth salient pole to generate the other one of the first synthesized detection signal and the second synthesized detection signal.

2. The rotation angle sensor system according to claim 1, wherein the synthesis circuit generates one of the first synthesized detection signal and the second synthesized detection signal using a first detection signal from a first detection coil installed at a first electrical angle based on the first pole and a second detection signal from a second detection coil installed at a second electrical angle different from the first electrical angle based on the second pole.

3. The rotation angle sensor system according to claim 2, wherein the synthesis circuit weights the first detection signal and the second detection signal based on a difference between the first electrical angle and the second electrical angle, and then synthesizes the first detection signal and the second detection signal.

4. The rotation angle sensor system according to claim 3, wherein the difference between the first electrical angle and the second electrical angle is 72°.

5. The rotation angle sensor system according to claim 3, wherein the difference between the first electrical angle and the second electrical angle is 90°.

6. The rotation angle sensor system according to claim 2, wherein the first detection coil and the second detection coil are different in turn ratio.

7. A semiconductor device for processing a detection signal from a rotation angle sensor which includes a shaft angle multiplier of 2, a rotor having a first pole and a second pole and stator having a plurality of salient poles wound by detection coils, respectively, the semiconductor device comprising:
   a synthesis circuit configured to synthesize detection signals from the detection coils to generate a first synthesized detection signal and a second synthesized detection signal, and
   a conversion circuit configured to generate a detection clock signal based on the first and the second synthesized detection signal,
   wherein the first and the second synthesized detection signal are generated based on the detection signals from the detection coils wound on the salient poles which are installed at different electrical angles based on the first and the second pole, respectively,
   wherein the synthesis circuit includes a first adder and a second adder,
   wherein, when the synthesis circuit includes a plurality of amplifiers which amplify the detection signals from the detection coils at an individually set amplification factor, i) the first adder adds part of each output signal from the plurality of amplifiers to generate the first synthesized detection signal and ii) the second adder adds the other part of each output signal from the plurality of amplifiers to generate the second synthesized detection signal, and
   wherein, when the synthesis circuit includes 1) a plurality of variable amplifiers whose amplification factors can be individually set variably and 2) a selection circuit which transmits part of each output signal from the plurality of variable amplifiers to the first adder, and transmits the other part of each output signal from the plurality of variable amplifiers to the second adder according to a selection signal, i) the first adder adds part of each output signal from the selection circuit to generate the first synthesized detection signal and ii) the second adder adds the other part of each output signal from the selection circuit to generate the second synthesized detection signal.

8. The semiconductor device according to claim 7, wherein the synthesis circuit generates one of the first synthesized detection signal and the second synthesized detection signal using a first detection signal from a first detection coil installed at a first electrical angle based on the first pole and a second detection signal from a second detection coil installed at a second electrical angle different from the first electrical angle based on the second pole.

9. The semiconductor device according to claim 8, wherein the synthesis circuit weights the first detection signal from the first detection coil and the second detection signal from the second detection coil at a predetermined ratio which reflects a difference between the first electrical angle and the second electrical angle, and then adds the detection signals.

10. The semiconductor device according to claim 7, wherein at least one of the plurality of amplifiers includes:
a plurality of resistance elements;
an operational amplifier which performs an amplifying operation at an amplification factor determined based on resistance values of the plurality of resistance elements; and
a switch element which is coupled to both ends of one resistance element of the plurality of resistance elements and is controlled to switch on and off according to a PWM signal.

11. The semiconductor device according to claim 7, wherein the conversion circuit shifts a phase of an excitation signal included in the second synthesized detection signal by 90° based on a phase of an excitation signal included in the first synthesized detection signal from the synthesis circuit, and adds the two excitation signals after the shift.

12. The semiconductor device according to claim 7, further comprising:
an analog-to-digital converter which digitally converts the detection signals from the detection coils,
wherein the plurality of amplifiers in the synthesis circuit are constituted by a digital circuit which receives an input of a digital value from the analog-to-digital converter.

13. A rotation angle sensor system comprising:
a rotation angle sensor including 1) a rotor having a first pole and a second pole and 2) a stator having a plurality of salient poles wound by detection coils, respectively; and
a synthesis circuit configured to generate a first synthesized detection signal and a second synthesized detection signal based on detection signals from at least two of the detection coils, respectively,
wherein the salient poles are installed at different electrical angles based on the first pole and the second pole, respectively,
wherein the rotation angle sensor comprises shaft angle multiplier of 3,
wherein the stator includes:
a first salient pole;
a second salient pole installed at a position apart by 140° in a mechanical angle based on the first salient pole;
a third salient pole installed at a position apart by 140° in the mechanical angle based on the second salient pole;
a fourth salient pole installed at a position apart by 30° in the mechanical angle based on the first salient pole;
a fifth salient pole installed at a position apart by 140° in the mechanical angle based on the fourth salient pole; and
a sixth salient pole installed at a position apart by 140° in the mechanical angle based on the fifth salient pole, and
wherein the synthesis circuit synthesizes detection signals from the detection coils respectively wound around the first salient pole, the second salient pole and the third salient pole to generate one of the first synthesized detection signal and the second synthesized detection signal, and synthesizes detection signals from the detection coils respectively wound around the fourth salient pole, the fifth salient pole and the sixth salient pole to generate the other one of the first synthesized detection signal and the second synthesized detection signal.

* * * * *